US 12,049,144 B2

United States Patent
Chen et al.

(10) Patent No.: US 12,049,144 B2
(45) Date of Patent: Jul. 30, 2024

(54) TRANSMIT END, RECEIVE END, METHOD, AND SYSTEM FOR WIRELESS CHARGING

(71) Applicant: HUAWEI TECHNOLOGIES CO., LTD., Shenzhen (CN)

(72) Inventors: Shuangquan Chen, Shenzhen (CN); Zhixian Wu, Dongguan (CN); Yunhe Mao, Shenzhen (CN); Xiaosheng Zeng, Dongguan (CN); Hongcheng You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/840,963

(22) Filed: Jun. 15, 2022

(65) Prior Publication Data

US 2022/0340024 A1    Oct. 27, 2022

Related U.S. Application Data

(63) Continuation of application No. PCT/CN2020/115005, filed on Sep. 14, 2020.

(30) Foreign Application Priority Data

Dec. 17, 2019    (CN) .......................... 201911303839.1

(51) Int. Cl.
*B60L 53/122* (2019.01)
*B60L 53/62* (2019.01)
*H02J 50/12* (2016.01)

(52) U.S. Cl.
CPC ............. *B60L 53/122* (2019.02); *B60L 53/62* (2019.02); *H02J 50/12* (2016.02)

(58) Field of Classification Search
CPC .... B60L 53/122; B60L 53/62; B60L 2210/10; B60L 2210/20; B60L 53/66; B60L 53/12;
(Continued)

(56) References Cited

U.S. PATENT DOCUMENTS

2012/0293009 A1    11/2012  Kim et al.
2017/0028853 A1*    2/2017  Elshaer .................. B60L 53/68
(Continued)

FOREIGN PATENT DOCUMENTS

CN    101112732 A    1/2008
CN    104377839 A    2/2015
(Continued)

*Primary Examiner* — Lincoln D Donovan
*Assistant Examiner* — Alex W Lam
(74) *Attorney, Agent, or Firm* — Maier & Maier, PLLC

(57) ABSTRACT

A transmit end, a receive end, a method, and a system for wireless charging are provided, and are applied to the field of electric vehicles. A transmit-end controller compares an actual output current of an inverter with a preset upper limit value of an output current of the inverter and controls an output voltage of the inverter based on a comparison result to adjust a current of a transmit coil. A receive-end controller receives a sampled value of the current of the transmit coil that is sent by the transmit-end controller and updates a reference value of the current of the transmit coil when a difference between the sampled value of the current of the transmit coil and the reference value of the current of the transmit coil is greater than or equal to a preset value.

20 Claims, 22 Drawing Sheets

(58) Field of Classification Search
CPC .. H02J 50/12; H02J 50/80; H02J 50/10; H02J 50/70; H02J 50/50; H02J 5/005; H02J 50/20; H02J 7/025; H02J 7/007; H02J 7/00034; H02J 7/00045; H02J 7/0042; H02J 7/0027; H02J 7/2434; H02J 50/60; H02J 50/90; H02J 50/40; H02J 50/402; Y02T 10/72

See application file for complete search history.

(56) References Cited

U.S. PATENT DOCUMENTS

| | | | |
|---|---|---|---|
| 2017/0240055 A1* | 8/2017 | Nguyen | B60L 53/126 |
| 2018/0015832 A1* | 1/2018 | Nguyen | B60L 53/12 |
| 2018/0194236 A1* | 7/2018 | Elshaer | B60L 53/12 |
| 2018/0194237 A1 | 7/2018 | Sarwat et al. | |

FOREIGN PATENT DOCUMENTS

| | | | |
|---|---|---|---|
| CN | 104917365 A | 9/2015 | |
| CN | 105305660 A | 2/2016 | |
| CN | 106374578 A | 2/2017 | |
| CN | 106564392 A | 4/2017 | |
| CN | 108471173 A | 8/2018 | |
| CN | 108649712 A | 10/2018 | |
| CN | 109936120 A | 6/2019 | |
| CN | 110311476 A | 10/2019 | |
| CN | 110707767 A | 1/2020 | |
| CN | 111016694 A | 4/2020 | |
| EP | 4054053 A1 | 9/2022 | |
| JP | 2016195512 A | 11/2016 | |

* cited by examiner

TRANSMIT END, RECEIVE END, METHOD, AND SYSTEM FOR WIRELESS CHARGING

CROSS-REFERENCE TO RELATED APPLICATIONS

This application is a continuation of International Application No. PCT/CN2020/115005, filed on Sep. 14, 2020, which claims priority to Chinese Patent Application No. 201911303839.1, filed on Dec. 17, 2019, The disclosures of the aforementioned applications are hereby incorporated by reference in their entireties.

TECHNICAL FIELD

The embodiments relate to the field of wireless charging technologies, a transmit end, a receive end, a method, and a system for wireless charging.

BACKGROUND

As energy shortage and environmental pollution issues are intensified in modern society, electric vehicles, as new energy vehicles, have attracted wide attention from all circles. In an electric vehicle, a vehicle-mounted power battery pack serves as energy to drive the vehicle to run.

Currently, charging modes of electric vehicles include contact charging and wireless charging. The wireless charging mode is easy to use and has no spark and electric shock hazard. Therefore, wireless charging becomes a future development direction of electric vehicles.

The following describes an operating principle of a wireless charging system with reference to FIG. 1.

FIG. 1 is a schematic diagram of a wireless charging system.

The wireless charging system includes a transmit end for wireless charging (transmit end for short) and a receive end for wireless charging (receive end for short).

The transmit end includes an inverter H1, a transmit-end compensation network 100, and a transmit coil Lp.

The inverter H1 includes controllable switching transistors Q1 to Q4, and the inverter H1 is configured to convert a direct current output by a direct-current power supply into an alternating current.

The transmit coil Lp is configured to transmit the alternating current output by the inverter H1 in the form of an alternating magnetic field.

The receive end includes a receive coil Ls, a receive-end compensation network 200, and a rectifier H2.

For example, the rectifier H2 includes four controllable switching transistors S1 to S4. In addition, the rectifier may alternatively include only an uncontrollable diode, or may include both a diode and a controllable switching transistor. The rectifier H2 is configured to rectify an alternating current output by the receive coil Ls into a direct current and output the direct current to a load.

The receive coil Ls is configured to receive, in the form of an alternating magnetic field, electromagnetic energy transmitted by the transmit coil Lp.

Currently, a control method for a wireless charging system is mainly to simplify control of mutual operations between a transmit end and a receive end, to decouple control of the transmit end and control of the receive end as much as possible. However, in this case, an output current of an inverter is likely to exceed a limit value. As a result, a parameter of the inverter exceeds a limit value, and protection shutdown occurs.

SUMMARY

To resolve the foregoing problem, a transmit end, a receive end, a method, and a system for wireless charging may ensure that a parameter of an inverter does not exceed a limit value, and therefore protection shutdown is not triggered.

According to a first aspect, a transmit end of a wireless charging system includes an inverter, a transmit-end compensation network, a transmit coil, and a transmit-end controller. The inverter is configured to convert a direct current output by a direct-current power supply into an alternating current and supply the alternating current to the transmit-end compensation network. The transmit-end compensation network is configured to compensate the alternating current output by the inverter and transmit a compensated alternating current to the transmit coil. The transmit coil is configured to transmit, by using an alternating magnetic field, the alternating current compensated by the transmit-end compensation network. During operating, to prevent an output current of the inverter from exceeding a preset upper limit value to trigger protection shutdown, an output voltage of the inverter needs to be controlled to adjust a current of the transmit coil while it is ensured that an actual output current of the inverter is less than or equal to the preset upper limit value of the output current of the inverter. A purpose is to ensure that the output current of the inverter is within the allowed preset upper limit value, and also enable the receive end to have an appropriate adjustment range of the current of the transmit coil. The transmit end may cooperate with the receive end to adjust the current of the transmit coil while the transmit end does not trigger protection shutdown, thereby meeting a charging requirement of the receive end.

Optionally, the transmit-end controller is configured to: obtain a minimum allowed value of the current of the transmit coil based on the comparison result; and use, as a given value of the current of the transmit coil, a larger one of the minimum allowed value of the current of the transmit coil and a reference value of the current of the transmit coil that is sent by the receive end, and control the output voltage of the inverter based on the given value of the current of the transmit coil to adjust the current of the transmit coil. The minimum allowed value of the current of the transmit coil is used to make the actual output current of the inverter less than or equal to the preset upper limit value of the output current of the inverter. In a scenario in which both the transmit-end compensation network and the receive-end compensation network are in an LCC structure, and full-power output is required when a coupling coefficient k between the transmit coil and the receive coil is the largest and the output voltage is the lowest, when the output voltage is the lowest, correspondingly, the output current is the largest, a current of the receive coil is the largest, and the current of the transmit coil is the smallest. When the current of the transmit coil is the smallest, correspondingly, the output current of the inverter is the largest. Therefore, to prevent the output current of the inverter from exceeding the preset upper limit value, the minimum allowed value of the current of the transmit coil needs to be controlled. The reference value of the current of the transmit coil that is sent by the receive end is determined based on a target charging parameter of the wireless charging system. The target charging parameter may be a charging current, a charging voltage, or a charging power.

Optionally, the transmit-end controller is configured to: when a difference obtained by the preset upper limit value of the output current of the inverter minus the actual output current of the inverter is less than a first preset current value, the actual output current of the inverter is close to the preset upper limit value of the output current of the inverter, has reached an adjustment limit, and cannot be further increased. If the actual output current of the inverter is further increased, the actual output current of the inverter exceeds the preset upper limit value, and protection shutdown is triggered. In this case, only the minimum allowed value of the current of the transmit coil can be increased, to increase the current of the transmit coil, and further increase a transmit power.

Optionally, the transmit-end controller is configured to: when a difference obtained by the preset upper limit value of the output current of the inverter minus the actual output current of the inverter is greater than a second preset current value, it indicates that the output current of the inverter is not adjusted to a limit, and adjustment can still be performed. In this case, to enable the receive end to adjust the current of the transmit coil within a large range, the minimum allowed value of the current of the transmit coil can be decreased. The first preset current value is less than the second preset current value. For example, a value range of the first preset current value may be 0 A to 5 A, and a value range of the second preset current value may be 8 A to 10 A.

Optionally, the transmit-end controller is configured to obtain a phase shift angle of the inverter and an adjustment signal of an input voltage of the inverter based on a difference between the given value of the current of the transmit coil and a sampled value of the current of the transmit coil, and control the inverter based on the phase shift angle of the inverter and the adjustment signal of the input voltage of the inverter.

According to a second aspect, a receive end of a wireless charging system includes a receive coil, a receive-end compensation network, a power converter, and a receive-end controller. The receive coil is configured to convert an alternating magnetic field transmitted by a transmit end into an alternating current and transmit the alternating current to the compensation network. The receive-end compensation network is configured to compensate the alternating current and supply a compensated alternating current to a rectifier. The power converter is configured to rectify the compensated alternating current into a direct current and supply the direct current to a load. The receive-end controller is configured to receive a sampled value of a current of a transmit coil that is sent by a transmit-end controller, and update a reference value of the current of the transmit coil when a difference between the sampled value of the current of the transmit coil and the reference value of the current of the transmit coil is greater than or equal to a preset value, so that an actual output current of an inverter of the transmit end is less than or equal to a preset upper limit value of an output current of the inverter.

The receive end provided in this embodiment interacts with the transmit end but does not directly send the reference value of the current of the transmit coil to the transmit end. A magnitude of the current of the transmit coil affects the output current of the inverter, and when the current of the transmit coil is the smallest, the output current of the inverter is the largest. Therefore, to prevent the output current of the inverter from exceeding the preset upper limit value, the current of the transmit coil is detected in real time to obtain the sampled value of the current of the transmit coil. A reference value of the current of the transmit coil in a next period is updated only when there is an adjustment margin for the current of the transmit coil.

Optionally, the receive-end controller is configured to receive a minimum allowed value of the current of the transmit coil that is sent by the transmit end, use, as the reference value of the current of the transmit coil in the next period, a larger one of the minimum allowed value of the current of the transmit coil and an updated reference value of the current of the transmit coil, and send the larger value to the transmit-end controller. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest. The larger one of the minimum allowed value of the current of the transmit coil and the reference value of the current of the transmit coil is used as a minimum value of the current of the transmit coil in the next period, to ensure that the current of the transmit coil is not less than the minimum allowed value of the current of the transmit coil; otherwise, the output current of the inverter exceeds the preset upper limit value.

Optionally, the power converter includes the rectifier, the rectifier includes two bridge arms, and an upper bridge arm and a lower bridge arm of each bridge arm each include a controllable switching transistor. The receive-end controller updates the reference value of the current of the transmit coil based on a phase shift angle between the two bridge arms of the rectifier, the sampled value of the current of the transmit coil, the minimum allowed value of the current of the transmit coil, and a current reference value of the current of the transmit coil; and uses, as the reference value of the current of the transmit coil in the next period, the larger one of the minimum allowed value of the current of the transmit coil and the updated reference value of the current of the transmit coil, and sends the larger value to the transmit-end controller.

Optionally, the receive-end controller is configured to: when the phase shift angle between the two bridge arms of the rectifier is greater than a maximum value of a preset phase shift angle interval, and it is determined that a difference between a reference value of the current of the transmit coil that is sent to the transmit end in a previous period and a sampled value of the current of the transmit coil that is sent by the transmit end in the previous period is less than a first specified threshold, increase the reference value of the current of the transmit coil; and use, as the updated reference value of the current of the transmit coil in the next period, a larger one of the minimum allowed value of the current of the transmit coil and an increased reference value of the current of the transmit coil; or when the phase shift angle between the two bridge arms of the rectifier is less than a minimum value of the preset phase shift angle interval, and it is determined that the difference between the reference value of the current of the transmit coil that is sent to the transmit end in the previous period and the sampled value of the current of the transmit coil that is sent by the transmit end in the previous period is less than the first specified threshold, decrease the reference value of the current of the transmit coil; and use, as the updated reference value of the current of the transmit coil in the next period, a larger one of the minimum allowed value of the current of the transmit coil and a decreased reference value of the current of the transmit coil.

Optionally, the power converter includes the rectifier, a lower bridge arm of the rectifier includes a controllable switching transistor, and an upper bridge arm of the rectifier includes a diode; and the receive-end controller is configured to: update the reference value of the current of the transmit coil based on a duty cycle of the controllable switching transistor of the rectifier, the sampled value of the current of the transmit coil, the minimum allowed value of the current of the transmit coil, and a current reference value of the current of the transmit coil; and use, as the reference value of the current of the transmit coil in the next period, the larger one of the minimum allowed value of the current of the transmit coil and the updated reference value of the current of the transmit coil, and send the larger value to the transmit-end controller.

Optionally, the receive-end controller is configured to: when the duty cycle of the controllable switching transistor of the rectifier is greater than a maximum value of a preset duty cycle interval, and it is determined that a difference between a reference value of the current of the transmit coil that is sent to the transmit end in a previous period and a sampled value of the current of the transmit coil that is sent by the transmit end in the previous period is less than a first specified threshold, decrease the reference value of the current of the transmit coil; and use, as the updated reference value of the current of the transmit coil in the next period, a larger one of the minimum allowed value of the current of the transmit coil and a decreased reference value of the current of the transmit coil; or when the duty cycle of the controllable switching transistor of the rectifier is less than a minimum value of the preset duty cycle interval, and it is determined that the difference between the reference value of the current of the transmit coil that is sent to the transmit end in the previous period and the sampled value of the current of the transmit coil that is sent by the transmit end in the previous period is less than the first specified threshold, increase the reference value of the current of the transmit coil; and use, as the updated reference value of the current of the transmit coil in the next period, a larger one of the lower limit value of the current of the transmit coil and an increased reference value of the current of the transmit coil.

According to a third aspect, a method applied to a transmit end for wireless charging may include comparing an actual output current of an inverter with a preset upper limit value of an output current of the inverter; and controlling an output voltage of the inverter based on a comparison result to adjust a current of a transmit coil, so that the actual output current of the inverter is less than or equal to the preset upper limit value of the output current of the inverter.

During operating, to prevent the output current of the inverter from exceeding the preset upper limit value to trigger protection shutdown, the output voltage of the inverter needs to be controlled to adjust the current of the transmit coil while it is ensured that the actual output current of the inverter is less than or equal to the preset upper limit value of the output current of the inverter. A purpose is to ensure that the output current of the inverter is within the allowed preset upper limit value, and also enable a receive end to have an appropriate adjustment range of the current of the transmit coil. The transmit end may cooperate with the receive end to adjust the current of the transmit coil while the transmit end does not trigger protection shutdown, thereby meeting a charging requirement of the receive end.

Optionally, the controlling an output voltage of the inverter based on a comparison result to adjust a current of a transmit coil includes: obtaining a lower limit value of the current of the transmit coil based on the comparison result; and using, as a given value of the current of the transmit coil, a larger one of the lower limit value of the current of the transmit coil and a reference value of the current of the transmit coil that is sent by the receive end, and controlling the output voltage of the inverter based on the given value of the current of the transmit coil to adjust the current of the transmit coil. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest. The reference value of the current of the transmit coil is determined based on a target charging parameter of a wireless charging system.

In a scenario in which both a transmit-end compensation network and a receive-end compensation network are in an LCC structure, and full-power output is required when a coupling coefficient k between the transmit coil and a receive coil is the largest and the output voltage is the lowest, when the output voltage is the lowest, correspondingly, the output current is the largest, a current of the receive coil is the largest, and the current of the transmit coil is the smallest. When the current of the transmit coil is the smallest, correspondingly, the output current of the inverter is the largest. Therefore, to prevent the output current of the inverter from exceeding the preset upper limit value, the minimum allowed value of the current of the transmit coil needs to be controlled. The reference value of the current of the transmit coil that is sent by the receive end is determined based on the target charging parameter of the wireless charging system. The target charging parameter may be a charging current, a charging voltage, or a charging power.

Optionally, the obtaining a lower limit value of the current of the transmit coil based on the comparison result includes: when a difference between the preset upper limit value of the output current of the inverter and the actual output current of the inverter is less than a first preset current value, increasing the minimum allowed value of the current of the transmit coil, to increase the current of the transmit coil. It indicates that the actual output current of the inverter is close to the preset upper limit value of the output current of the inverter, has reached an adjustment limit, and cannot be further increased. If the actual output current of the inverter is further increased, the actual output current of the inverter exceeds the preset upper limit value, and protection shutdown is triggered. In this case, only the minimum allowed value of the current of the transmit coil can be increased, to increase the current of the transmit coil, and further increase a transmit power.

Optionally, when a difference obtained by the preset upper limit value of the output current of the inverter minus the actual output current of the inverter is greater than a second preset current value, it indicates that the output current of the inverter is not adjusted to a limit, and adjustment can still be performed. In this case, to enable the receive end to adjust the current of the transmit coil within a large range, the minimum allowed value of the current of the transmit coil can be decreased. The first preset current value is less than the second preset current value. For example, a value range of the first preset current value may be 0 A to 5 A, and a value range of the second preset current value may be 8 A to 10 A.

Optionally, the controlling the inverter based on the given value of the current of the transmit coil includes: obtaining a phase shift angle of the inverter and an adjustment signal of an input voltage of the inverter based on a difference between the given value of the current of the transmit coil and a sampled value of the current of the transmit coil, and controlling the inverter based on the phase shift angle of the inverter and the adjustment signal of the input voltage of the inverter.

According to a fourth aspect, a method applied to a receive end for wireless charging may include receiving a sampled value of a current of a transmit coil and a lower limit value of the current of the transmit coil that are sent by a transmit-end controller; and updating a reference value of the current of the transmit coil when a difference between the sampled value of the current of the transmit coil and the reference value of the current of the transmit coil is greater than or equal to a preset value, so that an actual output current of an inverter of a transmit end is less than or equal to a preset upper limit value of an output current of the inverter.

In the method provided in this embodiment, the receive end interacts with the transmit end, but does not directly send the reference value of the current of the transmit coil to the transmit end. A magnitude of the current of the transmit coil affects the output current of the inverter, and when the current of the transmit coil is the smallest, the output current of the inverter is the largest. Therefore, to prevent the output current of the inverter from exceeding the preset upper limit value, the current of the transmit coil is detected in real time to obtain the sampled value of the current of the transmit coil. A reference value of the current of the transmit coil in a next period is updated only when there is an adjustment margin for the current of the transmit coil.

Optionally, the updating the reference value of the current of the transmit coil includes: using, as the reference value of the current of the transmit coil in the next period, a larger one of the lower limit value of the current of the transmit coil and an updated reference value of the current of the transmit coil and sending the larger value to the transmit-end controller. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest.

The larger one of the minimum allowed value of the current of the transmit coil and the reference value of the current of the transmit coil is used as a minimum value of the current of the transmit coil in the next period, to ensure that the current of the transmit coil is not less than the minimum allowed value of the current of the transmit coil; otherwise, the output current of the inverter exceeds the preset upper limit value.

Optionally, the power converter includes a rectifier, the rectifier includes two bridge arms, and an upper bridge arm and a lower bridge arm of each bridge arm each include a controllable switching transistor; and the updating a reference value of the current of the transmit coil when a difference between the sampled value of the current of the transmit coil and the reference value of the current of the transmit coil is greater than or equal to a preset value, and using, as the reference value of the current of the transmit coil in the next period, a larger one of the minimum allowed value of the current of the transmit coil and an updated reference value of the current of the transmit coil includes:

updating the reference value of the current of the transmit coil based on a phase shift angle between the two bridge arms of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil.

Optionally, the updating the reference value of the current of the transmit coil based on a phase shift angle between the two bridge arms of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil includes:

when the phase shift angle between the two bridge arms of the rectifier is greater than a maximum value of a preset phase shift angle interval, and it is determined that a difference between a reference value of the current of the transmit coil that is sent to the transmit end in a previous period and a sampled value of the current of the transmit coil that is sent by the transmit end in the previous period is less than a first specified threshold, increasing the reference value of the current of the transmit coil; and using, as the updated reference value of the current of the transmit coil in the next period, a larger one of the minimum allowed value of the current of the transmit coil and an increased reference value of the current of the transmit coil; or when the phase shift angle between the two bridge arms of the rectifier is less than a minimum value of the preset phase shift angle interval, and it is determined that the difference between the reference value of the current of the transmit coil that is sent to the transmit end in the previous period and the sampled value of the current of the transmit coil that is sent by the transmit end in the previous period is less than the first specified threshold, decreasing the reference value of the current of the transmit coil; and using, as the updated reference value of the current of the transmit coil in the next period, a larger one of the minimum allowed value of the current of the transmit coil and a decreased reference value of the current of the transmit coil.

Optionally, the power converter includes a rectifier, a lower bridge arm of the rectifier includes a controllable switching transistor, and an upper bridge arm of the rectifier includes a diode; and the updating a reference value of the current of the transmit coil when a difference between the sampled value of the current of the transmit coil and the reference value of the current of the transmit coil is greater than or equal to a preset value, and using, as the reference value of the current of the transmit coil in the next period, a larger one of the minimum allowed value of the current of the transmit coil and an updated reference value of the current of the transmit coil includes:

updating the reference value of the current of the transmit coil based on a duty cycle of the controllable switching transistor of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil.

Optionally, the updating the reference value of the current of the transmit coil based on a duty cycle of the controllable switching transistor of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil includes:

when the duty cycle of the controllable switching transistor of the rectifier is greater than a maximum value of a preset duty cycle interval, and it is determined that a difference between a reference value of the current of the transmit coil that is sent to the transmit end in a previous period and a sampled value of the current of the transmit coil that is sent by the transmit end in the previous period is less than a first specified threshold, decreasing the reference value of the current of the transmit coil; and using, as the updated reference value of the current of the transmit coil in the next period, a larger one of the minimum allowed value of the current of the transmit coil and a decreased reference value of the current of the transmit coil; or when the duty cycle of the controllable switching transistor of the rectifier is less than a minimum value of the preset duty cycle interval, and it is determined that the difference between the reference value of the current of the transmit coil that is sent to the transmit end in the previous period and the sampled value of the current of the transmit coil that is sent by the transmit end in the previous period is less than the first specified threshold, increasing the reference value of the current of the transmit coil; and using, as the updated reference value of the current of the transmit coil in the next period, a larger one of the minimum allowed value of the current of the transmit coil and an increased reference value of the current of the transmit coil.

The phase shift angle of the rectifier is compared with the preset phase shift angle interval. When the phase shift angle between the two bridge arms of the rectifier is greater than the maximum value of the preset phase shift angle interval or is less than the minimum value of the preset phase shift angle interval, it indicates that the phase shift angle of the receive end has reached a limit value of adjustment, and the phase shift angle cannot be further increased or decreased. In this case, only the reference value of the current of the transmit coil of the transmit end can be adjusted. An output current of the system cannot be changed through further adjustment by the receive end, and the output current of the system can be adjusted only by the transmit end by adjusting the current of the transmit coil.

According to a fifth aspect, a wireless charging system may include the transmit end for wireless charging and the receive end for wireless charging that are provided above.

In the wireless charging system, the receive end interacts with the transmit end, to achieve better control, and enable the receive end to have a large adjustment range of a current of a transmit coil while it is ensured that an output current of an inverter does not exceed a preset upper limit value. The transmit end additionally monitors the output current of the inverter, so that an actual output current of the inverter is less than or equal to the preset upper limit value, thereby avoiding triggering protection shutdown. The receive end additionally determines whether the current of the transmit coil is properly adjusted, and periodically updates a reference value of the current of the transmit coil to avoid the following problem: When wireless communication is interrupted, the reference value of the current of the transmit coil that is sent by the receive end has a large step, resulting in overshoot of an output current of the system, and causing a safety hazard.

In a scenario in which both a transmit-end compensation network and a receive-end compensation network are in an LCC structure, and full-power output is required when a coupling coefficient k between the transmit coil and a receive coil is the largest and the output voltage is the lowest, when the output voltage is the lowest, correspondingly, the output current is the largest, a current of the receive coil is the largest, and the current of the transmit coil is the smallest. When the current of the transmit coil is the smallest, correspondingly, the output current of the inverter is the largest. Therefore, to prevent the output current of the inverter from exceeding the preset upper limit value, the minimum allowed value of the current of the transmit coil needs to be controlled. The reference value of the current of the transmit coil that is sent by the receive end is determined based on a target charging parameter of the wireless charging system. The target charging parameter may be a charging current, a charging voltage, or a charging power.

The transmit end and the receive end provided in this embodiment are intended to make an output parameter of the wireless charging system reach a specified value. The output parameter of the system may be an output current, an output voltage, or an output power. Because the system is a wireless charging system, the output current, the output voltage, or the output power is also the charging current, the charging voltage, or the charging power. To meet the output parameter of the system, a rectifier of the receive end includes only a diode, thereby avoiding the following problem: During parameter adjustment, only the current of the transmit coil of the transmit end can be adjusted to make the output parameter of the system meet a requirement. A controlled signal of the transmit end may be the current of the transmit coil, an output voltage of the inverter, or an output power of the inverter. The following embodiments are all described by using an example in which the controlled signal is the current of the transmit coil. When the rectifier of the receive end includes an adjustable parameter, for example, the rectifier includes a controllable switching transistor, the output parameter of the system can be adjusted by adjusting a duty cycle of the controllable switching transistor or a phase shift angle between two bridge arms. However, when the adjustable parameter of the receive end is adjusted to a limit value but the output parameter of the system still cannot be met, the current of the transmit coil of the transmit end can be further adjusted to make the output parameter of the system meet the requirement.

A transmit end for wireless charging may prevent protection shutdown from being triggered when an output current of an inverter does not exceed a protection limit value by controlling a given value of a current of a transmit coil of the transmit end. It can be understood that the current of the transmit coil may be an output voltage or an output power of the inverter, or the current of the transmit coil. A transmit-end controller obtains a minimum allowed value of the current of the transmit coil based on an actual output current of the inverter and a preset upper limit value of the output current of the inverter; and uses, as the given value of the current of the transmit coil, a larger one of the minimum allowed value of the current of the transmit coil and a reference value of the current of the transmit coil that is sent by a receive end, and controls the inverter based on the given value of the current of the transmit coil, so that the output current of the inverter does not exceed an upper limit value or a lower limit value.

In a transmit end for wireless charging, a receive-end controller may determine, based on a reference value of a current of a transmit coil and a sampled value of the current of the transmit coil that is sent by a transmit end, whether the current of the transmit coil is properly adjusted. When the current of the transmit coil is not properly adjusted, the receive-end controller continues to wait, without updating the reference value of the current of the transmit coil of the transmit end. Whether the current of the transmit coil is properly adjusted may be determined based on whether a difference between the reference value of the current of the transmit coil and the sampled value of the current of the transmit coil that is fed back by the transmit end is less than a preset value. When the current of the transmit coil is properly adjusted, the receive-end controller updates a reference value of the current of the transmit coil in a next period in a timely manner. This can avoid the following problem: When wireless communication between the transmit end and the receive end is interrupted, the reference value of the current of the transmit coil that is sent by the receive end to the transmit end has a large step, resulting in overshoot of an output current of the system, and causing a safety hazard in wireless charging. It should be noted that an adjustment process is a step-by-step process, and the current of the transmit coil is adjusted step by step, to make an output parameter of the system meet a requirement.

In the wireless charging system, the receive end interacts with the transmit end, to achieve better control, and enable the receive end to have a large adjustment range of the current of the transmit coil while it is ensured that an output current of an inverter does not exceed a preset upper limit value.

DETAILED DESCRIPTION OF THE EMBODIMENTS

To enable a person skilled in the art to better understand solutions provided in the embodiments, the following first describes an application scenario of a transmission apparatus for wireless charging.

According to a receive end for wireless charging, a receive coil wirelessly senses an alternating magnetic field transmitted by a transmit end and converts the alternating magnetic field into a direct current for charging a load. When the receive end for wireless charging and the transmit end for wireless charging are applied to the field of electric vehicles, the transmit end may be located on ground, the receive end may be located in an electric vehicle, and the receive end charges a vehicle-mounted power battery string of the electric vehicle. In addition, wireless charging may also be applied to another field, for example, the field of unmanned aerial vehicle charging. The embodiments are described by using an example in which wireless charging is applied to an electric vehicle.

Figure 1:
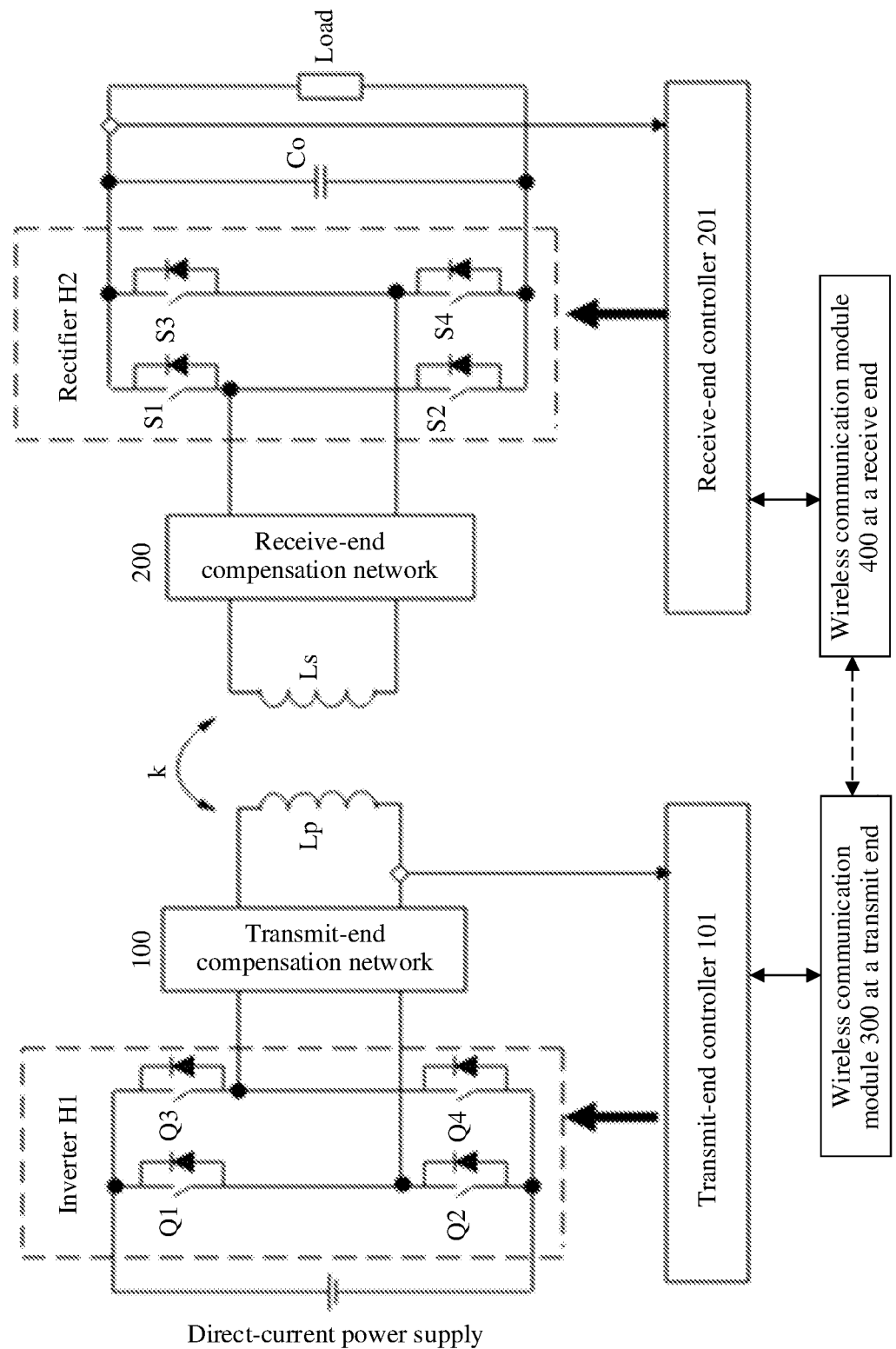
FIG. 1 is a schematic diagram of a wireless charging system.
Figure 2:
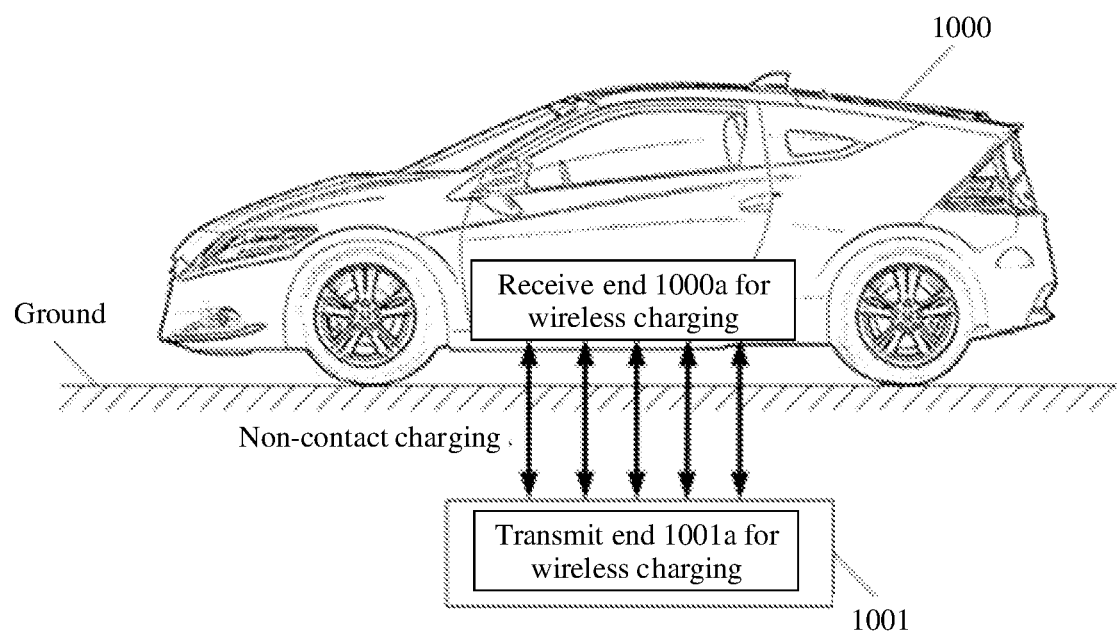
FIG. 2 is a schematic diagram of a wireless charging system for an electric vehicle.

FIG. 2 is a schematic diagram of a wireless charging system for an electric vehicle.

The wireless charging system may include at least an electric vehicle 1000 and a wireless charging station 1001.

A receive end 1000a for wireless charging is located in the electric vehicle 1000, and a transmit end 1001a for wireless charging is located in the wireless charging station 1001 on ground.

Currently, a charging process of the wireless charging system is that the receive end 1000a for wireless charging and the transmit end 1001a for wireless charging wirelessly transfer electric energy to charge a power battery string.

The wireless charging station 1001 may be a fixed wireless charging station, a fixed wireless charging parking space, a wireless charging road, or the like. The transmit end 1001a for wireless charging may be disposed on the ground or buried under the ground (the figure shows a case in which the transmit end 1001a for wireless charging is buried under the ground).

The receive end 1000a for wireless charging may be integrated at the bottom of the electric vehicle 1000. When the electric vehicle 1000 enters a wireless charging range of the transmit end 1001a for wireless charging, the electric vehicle 1000 may be charged through wireless charging. A power receiving module and a rectifier circuit of the receive end 1000a for wireless charging may be integrated or separated. This is not limited. When the power receiving module and the rectifier circuit are separated, a rectifier in the rectifier circuit is usually placed in the vehicle.

A power transmission module and an inverter of the transmit end 1001a for wireless charging may be integrated or separated. In addition, non-contact charging may be that the receive end 1000a for wireless charging and the transmit end 1001a for wireless charging transmit energy through electric field or magnetic field coupling. Electric field induction, magnetic induction, magnetic resonance, wireless radiation, or the like may be used. This is not limited in this embodiment. The electric vehicle 1000 and the wireless charging station 1001 may further perform bidirectional charging. The wireless charging station 1001 may charge the electric vehicle 1000 by using a charging power supply, and the electric vehicle 1000 may also discharge to the charging power supply.

Figure 3:
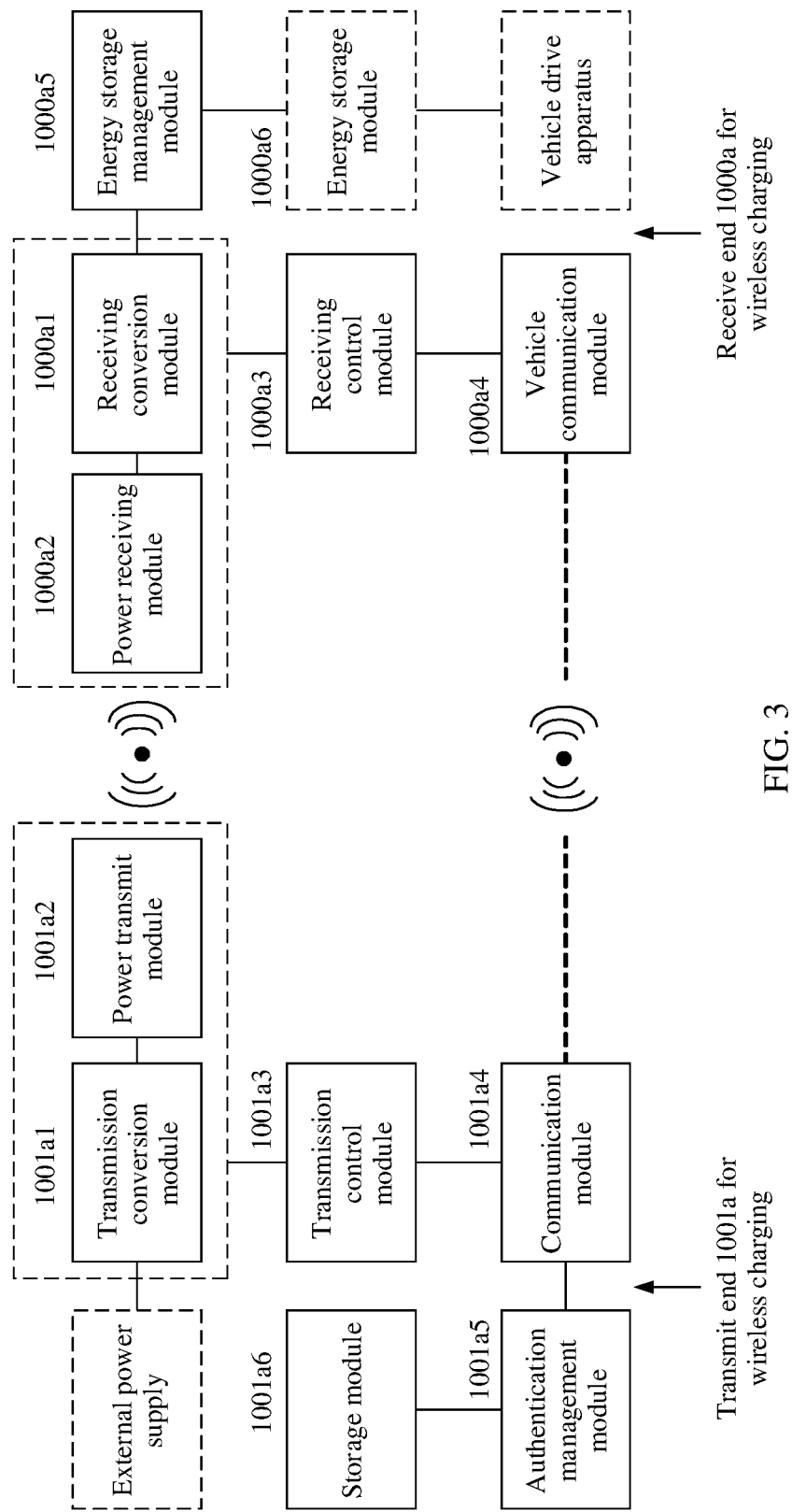
FIG. 3 is a schematic diagram of a structure of a wireless charging system for an electric vehicle that corresponds to FIG. 2.

FIG. 3 is a schematic diagram of a structure of a wireless charging system for an electric vehicle that corresponds to FIG. 2.

A transmit end 1001a for wireless charging shown in the figure includes a transmission conversion module 1001a1, a power transmit antenna 1001a2, a transmission control module 1001a3, a communication module 1001a4, an authentication management module 1001a5, and a storage module 1001a6.

A receive end 1000a for wireless charging includes a power receiving module 1000a2, a receiving control module 1000a3, a receiving conversion module 1000a1, a vehicle communication module 1000a4, an energy storage management module 1000a5, and an energy storage module 1000a6. In addition, the receiving conversion module 1000a1 may be connected to the energy storage module 1000a6 through the energy storage management module 1000a5, and received energy is used to charge the energy storage module 1000a6, to further drive the electric vehicle. The energy storage management module 1000a5 and the energy storage module 1000a6 may be located inside the receive end 1000a for wireless charging or may be located outside the receive end 1000a for wireless charging. This is not limited in this embodiment. The power receiving module 1000a2 includes a receive coil.

The transmission conversion module 1001a1 may be connected to an external power supply and convert an alternating current or a direct current obtained from the external power supply into a high-frequency alternating current. When input of the external power supply is an alternating current, the transmission conversion module 1001a1 includes at least a power factor correction unit and an inverter. When input of the external power supply is a direct current, the transmission conversion module 1001a1 includes at least an inverter. The power factor correction unit is configured to make an input current phase of the wireless charging system consistent with a voltage phase of a power grid, to reduce harmonic content of the wireless charging system and increase a power factor value, so as to reduce pollution of the wireless charging system to the power grid and improve reliability. The power factor correction unit may further increase or decrease an output voltage of the power factor correction unit according to a requirement of a next stage. The inverter converts the voltage output by the power factor correction unit into a high-frequency alternating current, and then the high-frequency alternating current is applied to the power transmission module 1001a2. The high-frequency alternating-current voltage can improve transmission efficiency and increase a transmission distance. The external power supply may be located inside or outside the transmit end 1001a for wireless charging.

The power transmission module 1001a2 is configured to transmit, in the form of an alternating magnetic field, the alternating current output by the transmission conversion module 1001a1. The power transmission module 1001a2 includes a transmit coil.

The transmission control module 1001a3 may control adjustment of voltage, current, and frequency conversion parameters of the transmission conversion module 1001a1 according to an actual transmit power requirement of wireless charging, to control voltage and current output adjustment of the high-frequency alternating current in the power transmission module 1001a2.

The communication module 1001a4 and the vehicle communication module 1000a4 implement wireless communication between the transmit end 1001a for wireless charging and the receive end 1000a for wireless charging, including power control information, failure protection information, on/off information, interactive authentication information, and the like. The transmit end 1001a for wireless charging may receive information sent by the receive end 1000a for wireless charging, for example, attribute information, a charging request, and interactive authentication information of the electric vehicle. In addition, the transmit end 1001a for wireless charging may further send transmission control information of wireless charging, interactive authentication information, historical data information of wireless charging, and the like to the receive end 1000a for wireless charging. A mode of the wireless communication may include but is not limited to any one or a combination of Bluetooth, Wireless Fidelity (Wi-Fi), the ZigBee protocol, a radio frequency identification (RFID) technology, a long range (Lora) wireless technology, and a near field communication (NFC) technology. Further, the communication module 1001a4 may further communicate with an intelligent terminal of a user to which the electric vehicle belongs, and the user to which the electric vehicle belongs implements remote authentication and user information transmission by using a communication function.

The authentication management module 1001a5 is configured to perform interactive authentication and permission management on the electric vehicle and the transmit end 1001a for wireless charging in the wireless charging system.

The storage module 1001a6 is configured to store charging process data, interactive authentication data (for example, interactive authentication information), permission management data (for example, permission management information), and the like of the transmit end 1001a for wireless charging. The interactive authentication data and the permission management data may be factory-specified or user-specified. This is not limited in this embodiment.

The power receiving module 1000a2 receives, in the form of an alternating magnetic field, electromagnetic energy transmitted by the power transmission module 1001a2. Structural composition forms of compensation circuits of the power transmission module 1001a2 and the power receiving module 1000a2 in the wireless charging system include an S-S type, a P-P type, an S-P type, a P-S type, an LCL-LCL type, an LCL-P type, an LCC-LCC type, and the like. This is not limited in this embodiment. Functions of the transmit end 1001a for wireless charging and the receive end 1000a for wireless charging may be interchanged. The receive end

1000a for wireless charging may alternatively charge the transmit end 1001a for wireless charging.

The receiving conversion module 1000a1 converts the electromagnetic energy received by the power receiving module 1000a2 into a direct current required for charging the energy storage module 1000a6. The receiving conversion module 1000a1 includes at least a compensation circuit and a rectifier. The rectifier converts a high-frequency resonance current and voltage received by the power receiving module into a direct current.

The receiving control module 1000a3 can adjust parameters, such as a voltage, a current, and a frequency, of the receiving conversion module 1000a1 according to an actual receive power requirement of wireless charging.

Structures of compensation networks of a transmit end and a receive end are not limited. For example, FIG. 4a to FIG. 4d shows implementations of several compensation networks.

For details, refer to schematic diagrams of structures of various compensation networks shown in FIG. 4a to FIG. 4d.

Compensation networks of a transmit end shown in FIG. 4a to FIG. 4d are used as examples. Lp in the figures indicates a transmit coil.

Figure 4A:
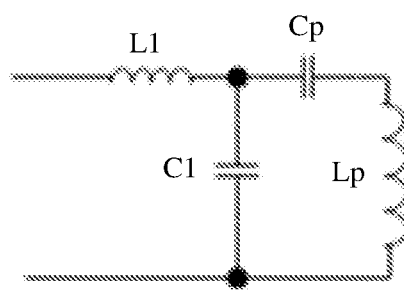
FIG. 4a is a schematic diagram of an LCC-type compensation network.

In FIG. 4a, L1, C1, and Cp form an LCC-type compensation network.

Figure 4B:
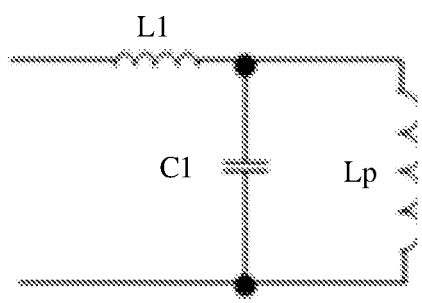
FIG. 4b is a schematic diagram of an LC-type compensation network.

In FIG. 4b, L1 and C1 form an LC-type compensation network.

Figure 4C:
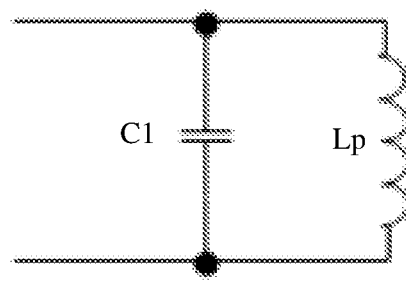
FIG. 4c is a schematic diagram of a P-type compensation network.

In FIG. 4c, C1 and Lp are in a parallel structure and form a P-type compensation network.

Figure 4D:
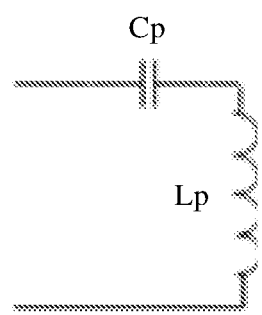
FIG. 4d is a schematic diagram of an S-type compensation network.

In FIG. 4d, Cp and Lp are in a series structure and form an S-type compensation network.

A transmit end and a receive end provided in the embodiments are intended to make an output parameter of a wireless charging system reach a value. The output parameter of the system may be an output current, an output voltage, or an output power. Because the system is a wireless charging system, the output current, the output voltage, or the output power is also a charging current, a charging voltage, or a charging power. To meet the output parameter of the system, a rectifier of the receive end includes only a diode, thereby avoiding the following problem: During parameter adjustment, only a current of a transmit coil of the transmit end can be adjusted to make the output parameter of the system meet a requirement. A controlled signal of the transmit end may be the current of the transmit coil, an output voltage of an inverter, or an output power of the inverter. The following embodiments are all described by using an example in which the controlled signal is the current of the transmit coil. When the rectifier of the receive end includes an adjustable parameter, for example, the rectifier includes a controllable switching transistor, the output parameter of the system can be adjusted by adjusting a duty cycle of the controllable switching transistor or a phase shift angle between two bridge arms. However, when the adjustable parameter of the receive end is adjusted to a limit value but the output parameter of the system still cannot be met, the current of the transmit coil of the transmit end can be further adjusted to make the output parameter of the system meet the requirement. The following first describes a transmit end provided in the embodiments of, and then describes a receive end provided in the embodiments.

To resolve the foregoing problem a transmit end for wireless charging may prevent an output current of an inverter from exceeding a protection limit value to trigger protection shutdown by controlling a given value of a current of a transmit coil of the transmit end. It can be understood that a controlled signal may be an output voltage or an output power of the inverter, or the current of the transmit coil. A transmit-end controller obtains a minimum allowed value of the current of the transmit coil based on an actual output current of the inverter and a preset upper limit value of the output current of the inverter; and uses, as the given value of the current of the transmit coil, a larger one of the minimum allowed value of the current of the transmit coil and a reference value of the current of the transmit coil that is sent by a receive end, and controls the inverter based on the given value of the current of the transmit coil, so that the output current of the inverter does not exceed an upper limit value or a lower limit value.

To make a person skilled in the art understand the solutions better, the following describes the embodiments with reference to the accompanying drawings. It can be understood that terms such as "first" and "second" in the following embodiments are merely intended for ease of description, but do not constitute a limitation.

Transmit End Embodiment:

An embodiment provides a transmit end for wireless charging. The following provides descriptions with reference to accompanying drawings.

Figure 5:
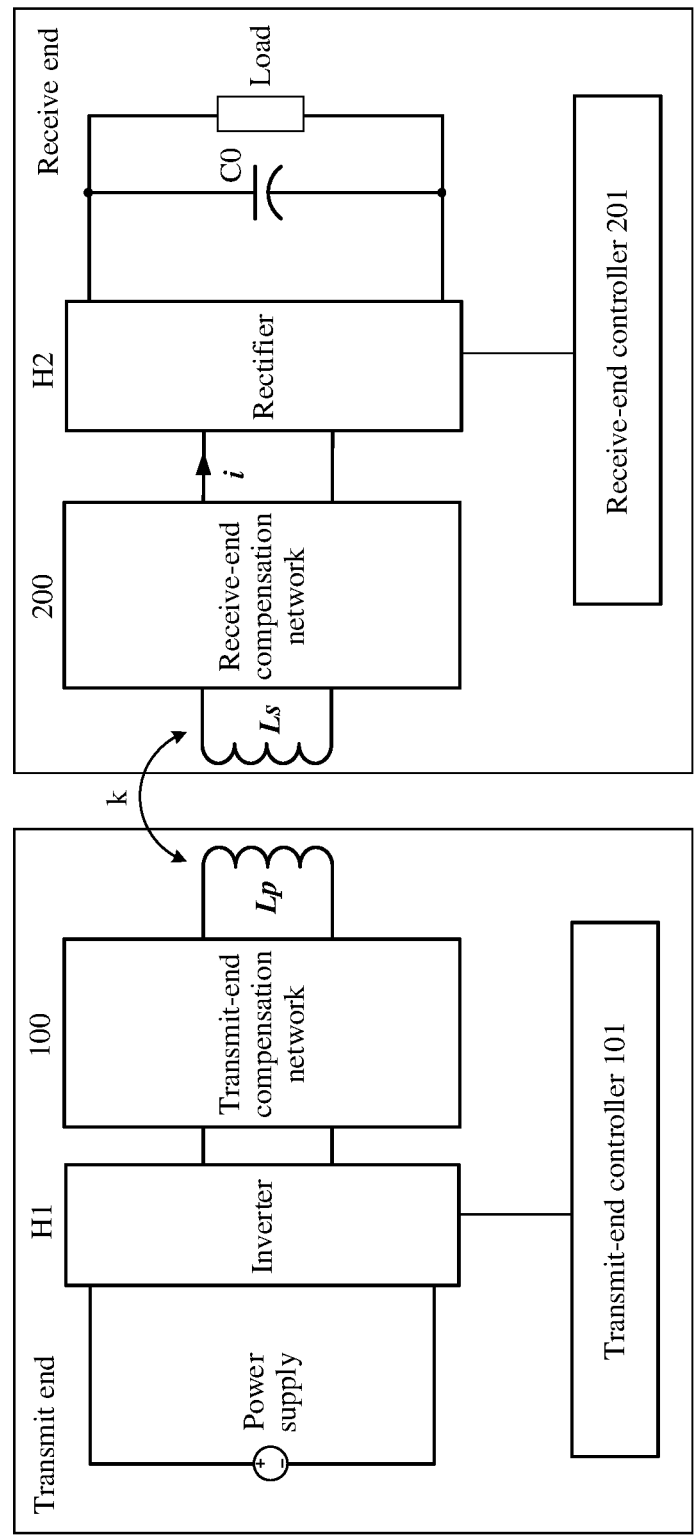
FIG. 5 is a schematic diagram of a wireless charging system corresponding to a transmit end for wireless charging according to an embodiment.

FIG. 5 is a schematic diagram of a wireless charging system corresponding to a transmit end for wireless charging according to an embodiment.

The transmit end for wireless charging provided in this embodiment includes an inverter H1, a transmit-end compensation network 100, a transmit coil Lp, and a transmit-end controller 101.

The inverter H1 is configured to convert a direct current output by a direct-current power supply into an alternating current and supply the alternating current to the transmit-end compensation network 100.

The transmit-end compensation network 100 is configured to compensate the alternating current output by the inverter H1 and transmit a compensated alternating current to the transmit coil Lp.

The transmit coil Lp is configured to transmit, by using an alternating magnetic field, the alternating current compensated by the transmit-end compensation network 100.

The transmit-end controller 101 is configured to compare an actual output current of the inverter with a preset upper limit value of an output current of the inverter and control an output voltage of the inverter based on a comparison result to adjust a current of the transmit coil, so that the actual output current of the inverter is less than or equal to the preset upper limit value of the output current of the inverter.

In this embodiment, the current of the transmit coil is not controlled only based on a reference value of the current of the transmit coil that is sent by a receive end; instead, the current of the transmit coil is comprehensively controlled while it is ensured that the output current of the inverter is less than or equal to the preset upper limit value of the output current of the inverter.

During implementation, the transmit-end controller 101 obtains a minimum allowed value of the current of the transmit coil based on the comparison result; and uses, as a given value of the current of the transmit coil, a larger one of the minimum allowed value of the current of the transmit coil and the reference value of the current of the transmit coil that is sent by the receive end, and controls the output voltage of the inverter based on the given value of the current of the transmit coil to adjust the current of the transmit coil. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest. The reference value of the current of the transmit coil is determined based on a target charging parameter of the wireless charging system.

Co in FIG. 5 indicates an output filter capacitor.

The following describes a relationship between the output voltage of the inverter H1, an output power of the inverter H1, and the current of the transmit coil with reference to a formula.

$$Po = \omega \times k \times \sqrt{Lp \times Ls} \times Ip \times Is \qquad (1)$$

In the formula (1), Po indicates an output power of the system, namely, an output power of the receive end, k indicates a coupling coefficient between the transmit coil Lp and a receive coil Ls, Lp and Ls indicate an inductance of the transmit coil and an inductance of the receive coil respectively, and Ip and Is indicate the current of the transmit coil and a current of the receive coil respectively.

In a scenario in which full-power output is required when the coupling coefficient k between the transmit coil Lp and the receive coil Ls is the largest and an output voltage of the receive end is the highest:

For example, both compensation networks of the transmit end and the receive end are in an LCC structure, and a power converter of the receive end is a diode rectifier. When the receive end is uncontrollable and the output voltage of the receive end is the highest, correspondingly, an output current of the receive end is the smallest, and an input current of the rectifier is the smallest. The input current of the rectifier is directly proportional to the current of the transmit coil. Correspondingly, the current Ip of the transmit coil is the smallest. The current Ip of the transmit coil is directly proportional to the output voltage Uinv of the inverter, and a product of the output current Ih of the inverter and the output voltage Uinv of the inverter is the output power of the inverter: Pinv=Ih×Uinv. When loss is ignored, Po=Pinv. Therefore, when the coupling coefficient k is the largest and the output voltage of the receive end is the highest, correspondingly, the current Ip of the transmit coil is the smallest, in other words, the output voltage Uinv of the inverter is the lowest, and the output current Ih of the inverter is the largest. In this case, the output current of the inverter is likely to exceed a limit value to cause protection shutdown.

To enable a person skilled in the art to better understand solutions provided in the embodiments, the following provides descriptions by using an example in which the current of the transmit coil is the current of the transmit coil, and the following embodiments are also described by using an example in which the current of the transmit coil is the current of the transmit coil.

The following provides descriptions with reference to a control method applicable to a receive end. All steps of the following method need to be performed by a transmit-end controller.

Figure 6:
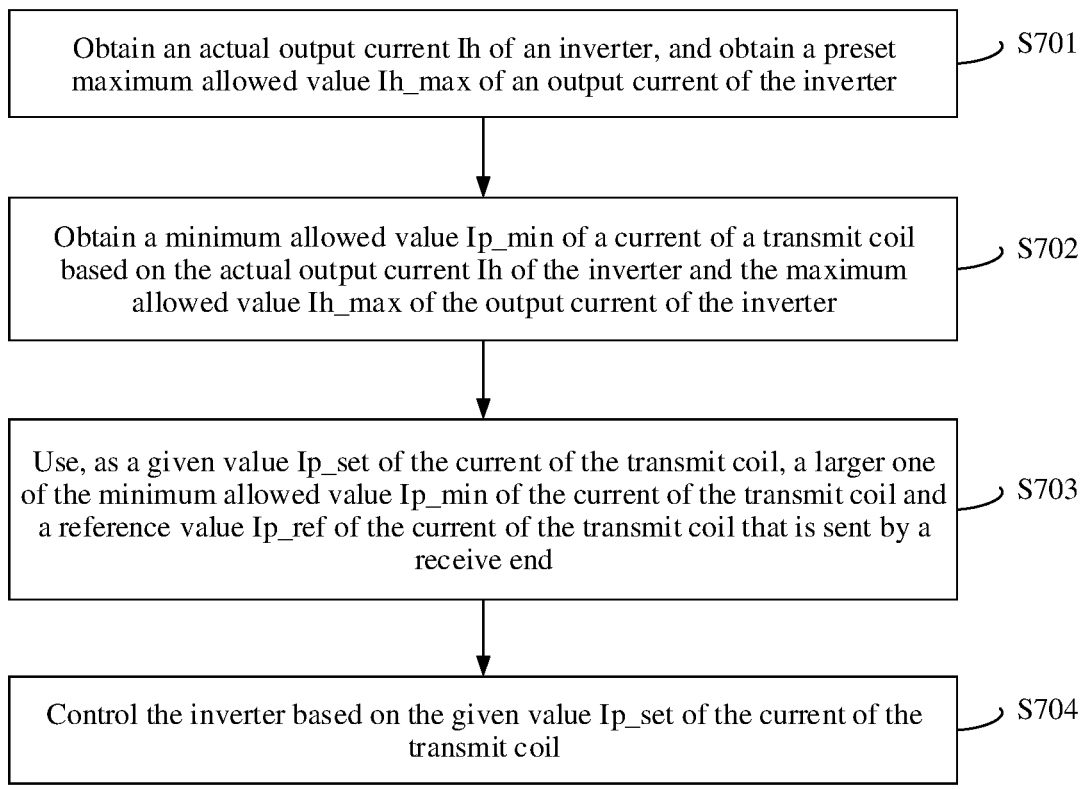
FIG. 6 is a flowchart of a method applicable to a receive end according to an embodiment.

FIG. 6 is a flowchart of a method applicable to a receive end according to an embodiment.

A transmit-end controller compares an actual output current of an inverter with a preset upper limit value of an output current of the inverter and controls an output voltage of the inverter based on a comparison result to adjust a current of a transmit coil, so that the actual output current of the inverter is less than or equal to the preset upper limit value of the output current of the inverter. This may include the following steps.

S701: Obtain the actual output current Ih of the inverter and obtain the preset upper limit value Ih_max of the output current of the inverter.

S702: Obtain a minimum allowed value Ip_min of the current of the transmit coil based on the actual output current Ih of the inverter and the preset upper limit value Ih_max of the output current of the inverter.

S703: Use, as a given value Ip_set of the current of the transmit coil, a larger one of the minimum allowed value Ip_min of the current of the transmit coil and a reference value Ip_ref of the current of the transmit coil that is sent by a receive end.

S704: Control the inverter based on the given value Ip_set of the current of the transmit coil.

The output voltage of the inverter is controlled based on the given value of the current of the transmit coil to adjust the current of the transmit coil. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest. The reference value of the current of the transmit coil is determined based on a target charging parameter of a wireless charging system.

The target charging parameter may be an output voltage, an output current, or a power of the receive end.

The transmit-end controller obtains a phase shift angle of the inverter and an adjustment signal of an input voltage of the inverter based on a difference between the given value of the current of the transmit coil and a sampled value of the current of the transmit coil, and controls the inverter based on the phase shift angle of the inverter and the adjustment signal of the input voltage of the inverter.

Although an internal structure of the inverter is not shown in FIG. 5, the inverter may be a full-bridge inverter and includes four controllable switching transistors.

In this embodiment, the minimum allowed value of the current of the transmit coil depends on the actual output current Ih of the inverter and the preset upper limit value Ih_max of the output current of the inverter. Therefore, when the actual output current Ih of the inverter changes, the minimum allowed value of the current of the transmit coil is affected. In addition, the minimum allowed value of the current of the transmit coil further affects the given value of the current of the transmit coil, to avoid shutdown upon a failure due to overcurrent protection for the output current of the inverter.

With reference to accompanying drawings, the following describes in detail a process of obtaining the minimum allowed value Ip_min of the current of the transmit coil based on the actual output current Ih of the inverter and the preset upper limit value Ih_max of the output current of the inverter.

Figure 7:
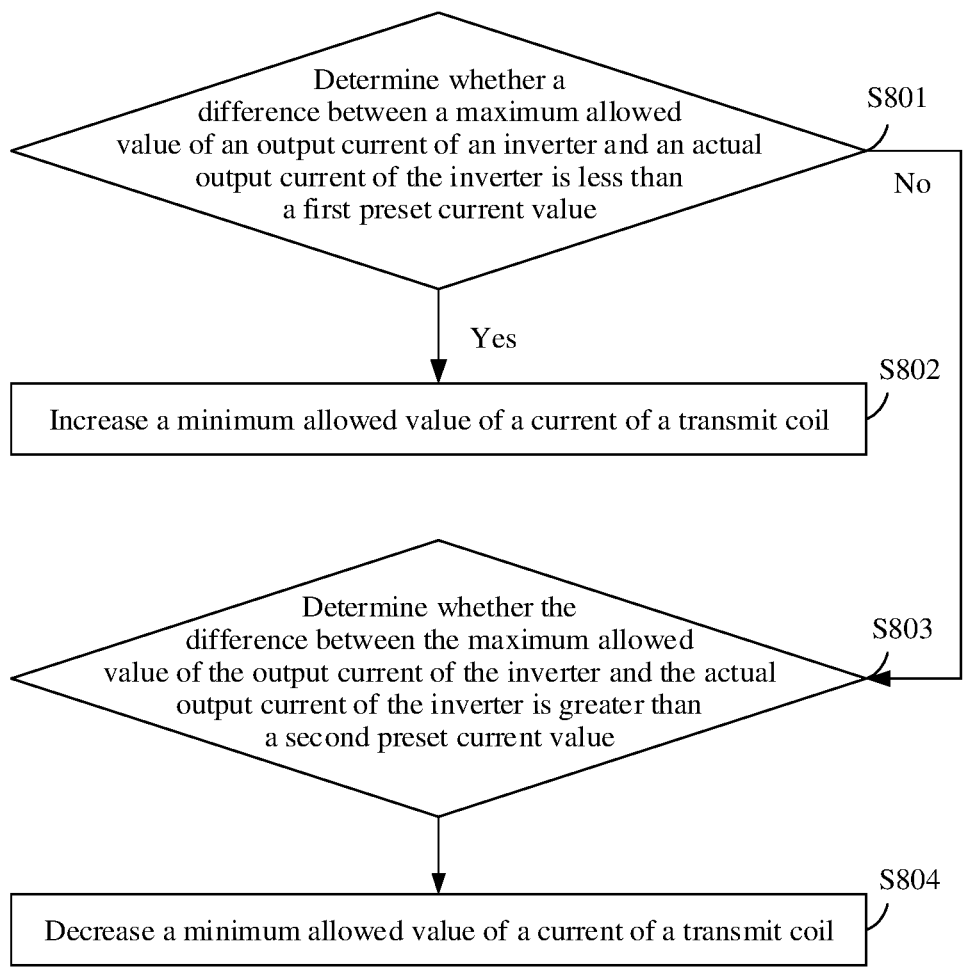
FIG. 7 is a flowchart of updating a minimum allowed value of a current of a transmit coil by a transmit end according to an embodiment.

FIG. 7 is a flowchart of updating a minimum allowed value of a current of a transmit coil by a transmit end according to an embodiment.

S801: Determine whether a difference between a preset upper limit value of an output current of an inverter and an actual output current of the inverter is less than a first preset current value $\Delta$Ih1, namely, $Ih_{max}$−Ih<$\Delta$Ih1. If yes, perform S802. Otherwise, when the difference between the preset upper limit value of the output current of the inverter and the actual output current of the inverter is greater than or equal to the first preset current value, perform S803.

S802: Increase the minimum allowed value of the current of the transmit coil, to increase the current of the transmit coil.

The minimum allowed value of the current of the transmit coil may be increased by using a first preset step. Each time it is determined that the condition is met, the minimum allowed value of the current of the transmit coil is increased by one first preset step, to gradually increase the minimum allowed value of the current of the transmit coil. The first preset step may be set according to an actual requirement. For example, the first preset step ΔIp1 may be 1 A.

$Ip\_min = Ip + \Delta Ip1$, where

Ip indicates a sampled value of the current of the transmit coil.

If $Ih_{max} - Ih < \Delta Ih1$, the output current of the inverter has been adjusted to a maximum value and cannot be further increased, and a transmit power can be increased only by increasing the current of the transmit coil (because the current of the transmit coil is related to an input voltage of the inverter and a phase shift angle between bridge arms).

S803: Determine whether the difference between the preset upper limit value of the output current of the inverter and the actual output current of the inverter is greater than a second preset current value ΔIh2. If yes, perform S804. The first preset current value is less than the second preset current value, namely, ΔIh1<

Figure 8:
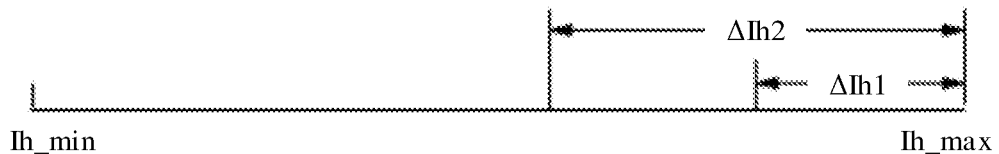
FIG. 8 is a schematic diagram of a distance from a preset upper limit value of an output current of an inverter.

As shown in FIG. 8, ΔIh1 and ΔIh2 are distances from the preset upper limit value Ih_max of the output current of the inverter. For example, ΔIh1=5 A, and ΔIh2=10 A.

S804: Decrease the minimum allowed value of the current of the transmit coil, to increase an adjustment range of the current of the transmit coil.

The minimum allowed value of the current of the transmit coil is decreased because the output current of the inverter has not reached an upper limit value. Therefore, the minimum allowed value of the current of the transmit coil may be decreased, so that a receive end has a larger adjustment range of the current of the transmit coil.

The minimum allowed value of the current of the transmit coil may be decreased by using a second preset step. Each time it is determined that the condition is met, the minimum allowed value of the current of the transmit coil is decreased by one second preset step, to gradually decrease the minimum allowed value of the current of the transmit coil. The second preset step may also be set according to an actual requirement. For example, the second preset step ΔIp2 may be 1 A.

$Ip_{min} = Ip - \Delta Ip2$

It can be understood from the foregoing analysis that, when $\Delta Ih2$ ($Ih_{max} - Ih$) > $\Delta Ih1$, the minimum allowed value Ip_min of the current of the transmit coil does not need to be updated.

Finally, a transmit-end controller sets a given value Ip_set of an actual current of the transmit coil based on a reference value Ip_ref of the current of the transmit coil in a previous period and the minimum allowed value Ip_min of the current of the transmit coil and takes a larger one of the two values: Ip_set=max(Ip_min, Ip_ref).

In an example, it is assumed that an output power Po of a wireless charging system is 10 kW, an output voltage range is 300 V to 420 V, a range of a full-power output current Io calculated based on the output power and the output voltage range is 24 A to 33 A, an input voltage range of the inverter is 300 V to 420 V, a coupling coefficient k between the transmit coil and a receive coil is 0.1 to 0.25, a maximum value Ip_max of the current of the transmit coil is 65 A, the preset upper limit value Ih_max of the output current of the inverter is 45 A, a maximum value Is_max of an input current of the receive coil is 65 A, and a maximum input current Ip_max allowed by a rectifier is 45 A.

According to the transmit end provided in this embodiment, the transmit end determines, by using the actual output current Ih of the inverter and the preset upper limit value Ih_max of the output current of the inverter, whether the minimum allowed value of the current of the transmit coil needs to be updated; and when determining that the minimum allowed value of the current of the transmit coil needs to be updated, updates the minimum allowed value of the current of the transmit coil in a timely manner, to avoid protection shutdown due to overcurrent of the output current of the inverter.

The following describes a receive end corresponding to the transmit end provided in the foregoing embodiment. The transmit end may interact with the following three receive ends to complete a wireless charging process. A power converter of the receive end may include only a rectifier or may include a rectifier and a direct current-direct current conversion circuit (DC-DC conversion circuit). The rectifier may include only a diode, or may include only a controllable switching transistor, or may include both a diode and a controllable switching transistor. The DC-DC conversion circuit may include a controllable switching transistor. When the rectifier does not include a controllable switching transistor, an output parameter of a system may be adjusted by adjusting a duty cycle of the controllable switching transistor in the DC-DC conversion circuit. This is described in detail below. The following separately describes implementations in which the receive end includes the foregoing three rectifiers.

Receive end embodiment 1:

The following describes an operating principle of a receive end of a wireless charging system according to an embodiment.

In this embodiment, a rectifier includes only a diode. An example in which the rectifier is an uncontrollable full-bridge diode rectifier is used for description.

Figure 9:
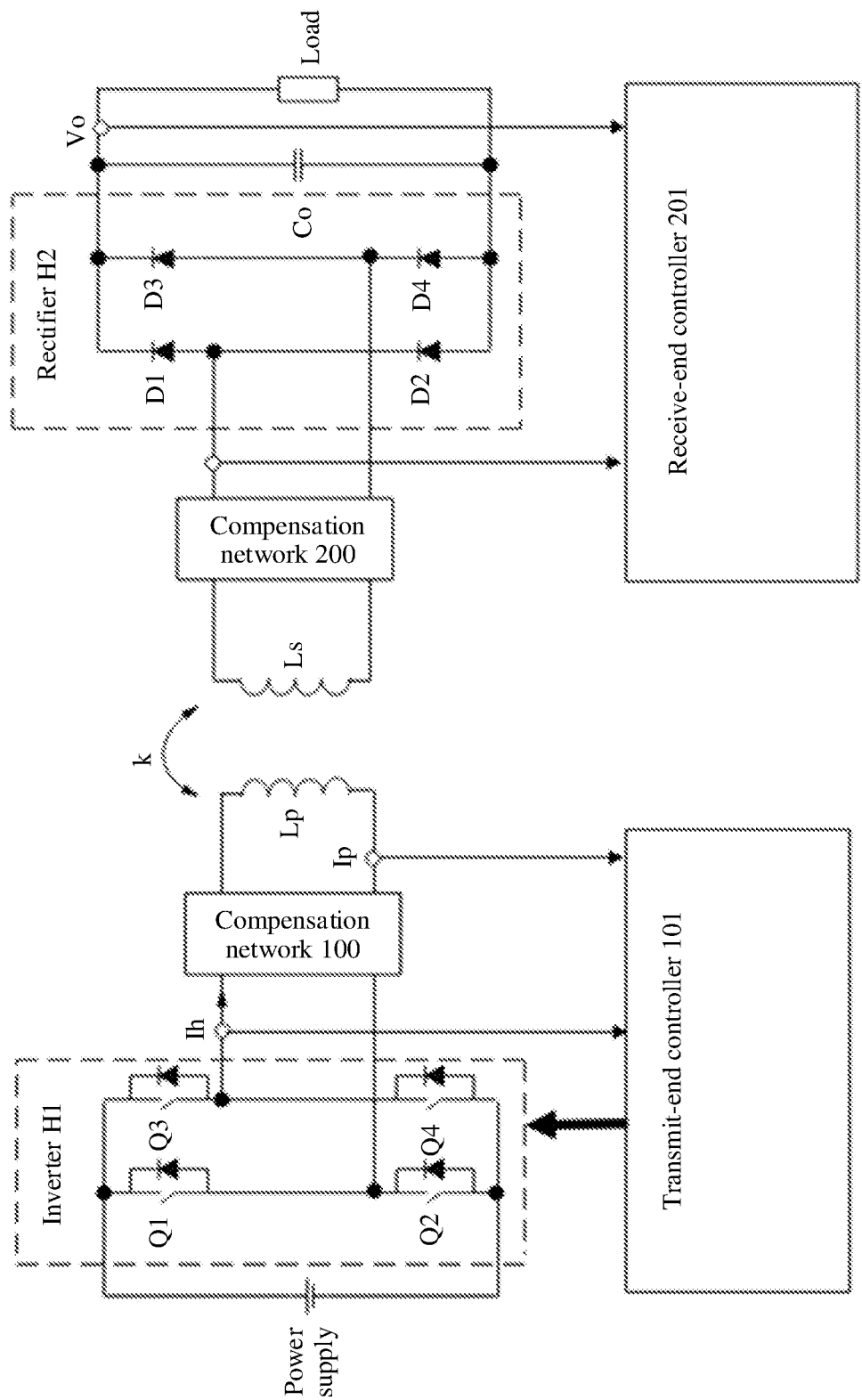
FIG. 9 is a schematic diagram of a system corresponding to a receive end according to an embodiment.

FIG. 9 is a schematic diagram of a system corresponding to a receive end according to an embodiment.

It can be understood from FIG. 9 that an inverter H1 of a transmit end includes four controllable switching transistors Q1 to Q4. A rectifier H2 of the receive end includes four diodes D1 to D4.

Because the rectifier H2 includes only a diode, the rectifier H2 has no adjustment amount, and an output current of the system is controlled by changing a current of a transmit coil of the transmit end. The current of the transmit coil of the transmit end may be an output voltage of the inverter, an output power of the inverter, or a current of the transmit coil.

The receive end for wireless charging provided in this embodiment includes a receive coil Ls, a receive-end compensation network 200, the rectifier H2, and a receive-end controller 201.

The receive coil Ls is configured to convert an alternating magnetic field transmitted by the transmit end into alternating current and transmit the alternating current to the receive-end compensation network 200.

The receive-end compensation network 200 is configured to compensate the alternating current, and then supply a compensated alternating current to the rectifier H2.

The rectifier H2 is configured to rectify the compensated alternating current into a direct current and supply the direct current to a load.

The receive-end controller 201 is configured to receive a sampled value of the current of the transmit coil that is sent by a transmit-end controller, and update a reference value of the current of the transmit coil when a difference between the sampled value of the current of the transmit coil and the reference value of the current of the transmit coil is greater than or equal to a preset value, so that an actual output current of the inverter of the transmit end is less than or equal to a preset upper limit value of an output current of the inverter.

The receive end provided in this embodiment interacts with the transmit end but does not directly send the reference value of the current of the transmit coil to the transmit end. A reference value of the current of the transmit coil in a next period is updated only when there is an adjustment margin for the current of the transmit coil.

During implementation, the receive-end controller is configured to receive the sampled value of the current of the transmit coil and a minimum allowed value of the current of the transmit coil that are sent by the transmit end; update the reference value of the current of the transmit coil when the difference between the sampled value of the current of the transmit coil and the reference value of the current of the transmit coil is greater than or equal to the preset value; and use, as the reference value of the current of the transmit coil in the next period, a larger one of the minimum allowed value of the current of the transmit coil and an updated reference value of the current of the transmit coil, and send the larger value to the transmit end. The minimum allowed value of the current of the transmit coil is used to make the actual output current of the inverter less than or equal to the preset upper limit value of the output current of the inverter. When the current of the transmit coil is the smallest, correspondingly, the output current of the inverter is the largest.

The larger one of the minimum allowed value of the current of the transmit coil and the reference value of the current of the transmit coil is used as a minimum value of the current of the transmit coil in the next period, to ensure that the current of the transmit coil is not less than the minimum allowed value of the current of the transmit coil; otherwise, the output current of the inverter exceeds the preset upper limit value.

When the difference between the sampled value of the current of the transmit coil and the reference value of the current of the transmit coil is less than the preset value, it indicates that the current of the transmit coil is not properly adjusted, and therefore the reference value of the current of the transmit coil does not need to be updated.

Co in FIG. 9 indicates an output filter capacitor.

The reference value of the current of the transmit coil of the transmit end is generated by the receive-end controller. The receive-end controller receives a charging instruction. The charging instruction may be delivered by a load, a battery management system (BMS), or a control interface. The charging instruction is a required output voltage, output current, or output power of a wireless charging system. The receive-end controller controls an output signal according to the charging instruction and generates the reference value of the current of the transmit coil of the transmit end. The reference value of the current of the transmit coil of the transmit end may be the reference value of the current of the transmit coil, a reference value of the output voltage of the inverter, or a reference value of the output power of the inverter.

According to the receive end provided in this embodiment, the receive-end controller determines, based on the reference value of the current of the transmit coil and the sampled value of the current of the transmit coil that is sent by the transmit end, whether the current of the transmit coil is properly adjusted. When the current of the transmit coil is not properly adjusted, the receive-end controller continues to wait, without updating the reference value of the current of the transmit coil. Whether the current of the transmit coil is properly adjusted may be determined based on whether the difference between the reference value of the current of the transmit coil and the sampled value of the current of the transmit coil that is fed back by the transmit end is less than the preset value. When the current of the transmit coil is properly adjusted, the receive-end controller updates a reference value of the current of the transmit coil in a next period in a timely manner. This can avoid the following problem: When wireless communication between the transmit end and the receive end is interrupted, the reference value of the current of the transmit coil that is sent by the receive end to the transmit end has a large step, resulting in overshoot of an output current of the system, and causing a safety hazard in wireless charging. It should be noted that an adjustment process is a step-by-step process, and the current of the transmit coil is adjusted step by step, to make an output parameter of the system meet a requirement.

The following provides descriptions by using an example in which the current of the transmit coil is the current of the transmit coil.

Figure 10:
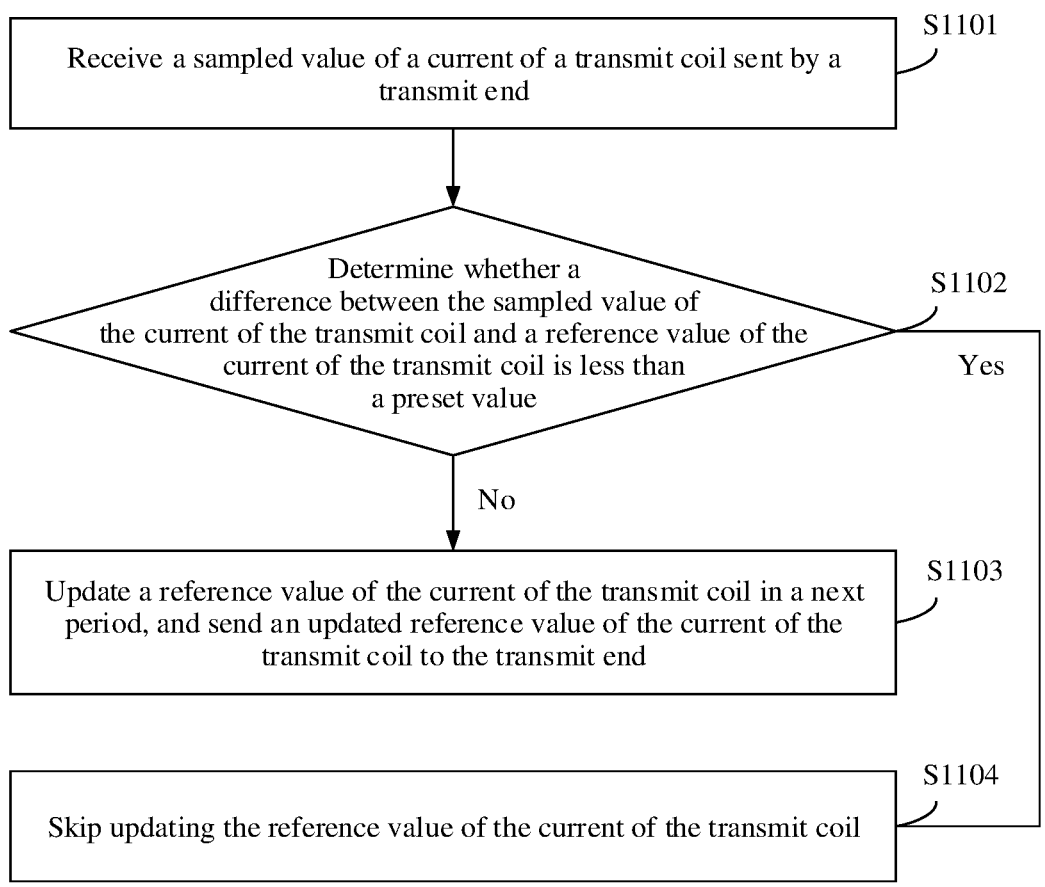
FIG. 10 is a flowchart of a receive end control method corresponding to FIG. 9.

FIG. 10 is a flowchart of a receive end control method corresponding to FIG. 9.

S1101: Receive a sampled value of a current of a transmit coil and a minimum allowed value of the current of the transmit coil that are sent by a transmit end.

S1102: Determine whether a difference between the sampled value of the current of the transmit coil and a reference value of the current of the transmit coil is less than a preset value. If no, perform S1103; otherwise, perform S1104.

S1103: Update the reference value of the current of the transmit coil, use, as a reference value of the current of the transmit coil in a next period, a larger one of the minimum allowed value of the current of the transmit coil and an updated reference value of the current of the transmit coil and send the larger value to the transmit end.

The receive-end controller may set, according to an actual requirement, whether the updating the reference value of the current of the transmit coil in the next period is increasing the reference value of the current of the transmit coil or decreasing the reference value of the current of the transmit coil. In addition, the receive-end controller may also set an increase step or a decrease step according to an actual requirement. This is not limited in this embodiment. An updated current of the transmit coil is compared with the minimum allowed value of the current of the transmit coil, and the larger one of the two values is sent to a transmit-end controller as the reference value of the current of the transmit coil in the next period. The larger one of the updated current of the transmit coil and the minimum allowed value of the current of the transmit coil is used as a final reference value of the current of the transmit coil, to limit a range of a minimum value of the current of the transmit coil, and ensure that the reference value of the current of the transmit coil that is sent to the transmit end is not less than the minimum allowed value of the current of the transmit coil.

S1104: Skip updating the reference value of the current of the transmit coil.

In this embodiment, the transmit-end controller does not directly generate a fixed reference value of the current of the transmit coil according to a charging instruction, but determines, based on the sampled value of the current of the transmit coil that is sent by the transmit end, whether the reference value of the current of the transmit coil needs to be updated. This can avoid the following problem: A large step occurs due to interruption of wireless communication, resulting in overshoot of an output voltage.

Receive End Embodiment 2:

In this embodiment, a rectifier includes only a controllable switching transistor. An example in which the rectifier is a full-bridge rectifier is used for description. Because the rectifier includes the controllable switching transistor, an output parameter (a current, a voltage, or a power) of a wireless charging system may be adjusted by first adjusting a phase shift angle between two bridge arms of the rectifier. When the phase shift angle is adjusted to a limit value and cannot be further adjusted, a current of a transmit coil of a transmit end is adjusted. The following provides descriptions still by using an example in which the current of the transmit coil of the transmit end is the current of the transmit coil.

Figure 11:
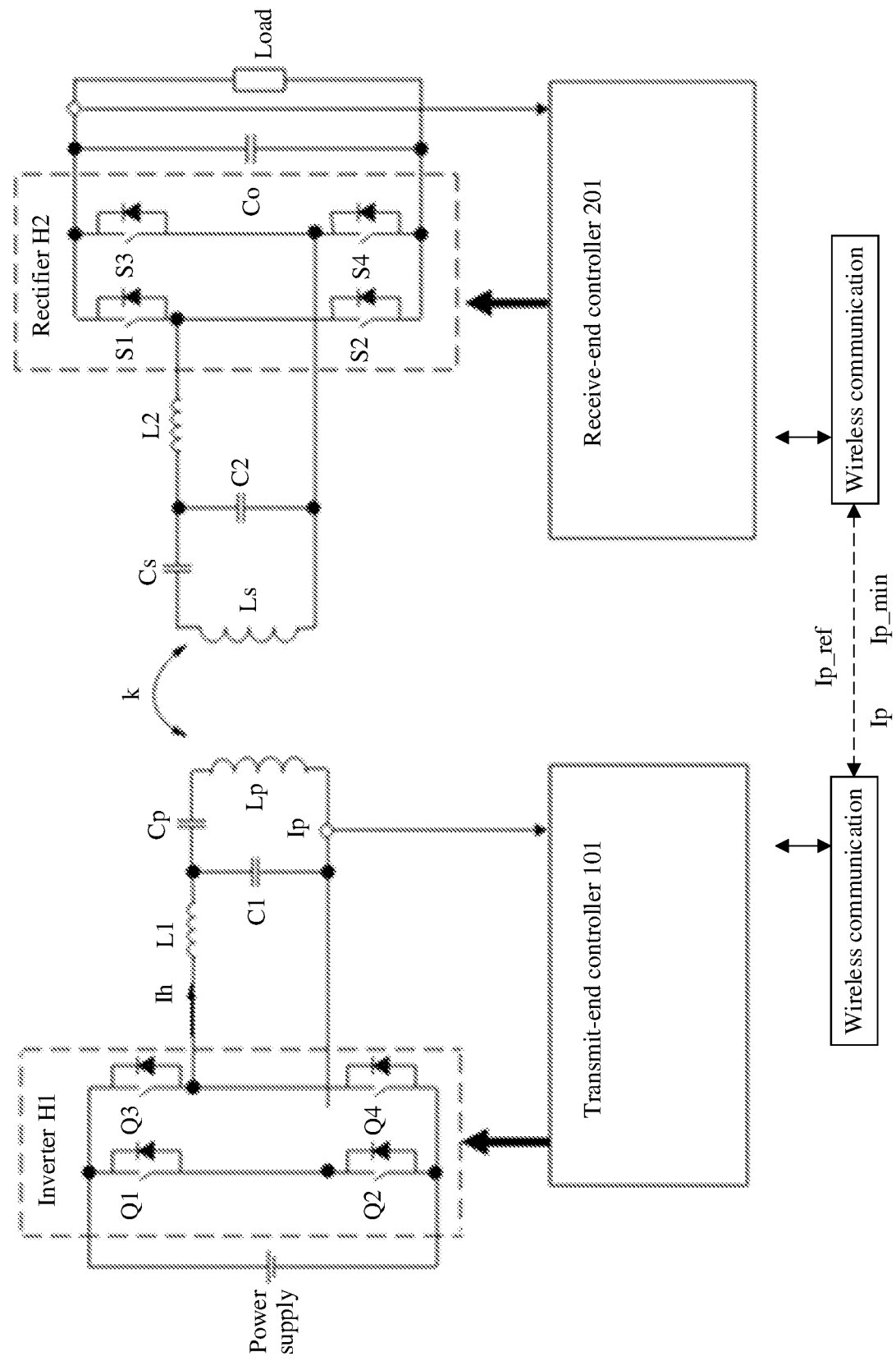
FIG. 11 is a schematic diagram of a system corresponding to another receive end according to an embodiment.

FIG. 11 is a schematic diagram of a system corresponding to another receive end according to an embodiment.

Figure 12:
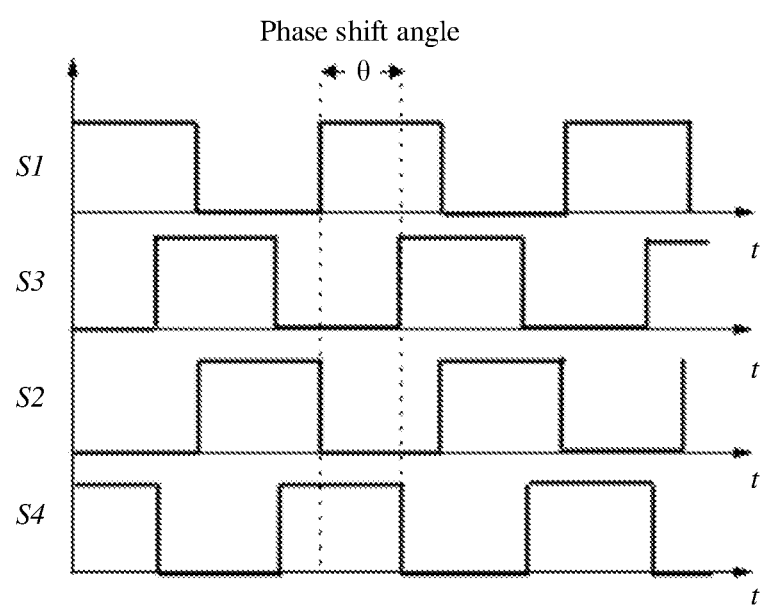
FIG. 12 is a schematic diagram of a drive signal and a phase shift angle of a rectifier.

It can be understood from FIG. 11 that a rectifier H2 includes two bridge arms, and an upper bridge arm and a lower bridge arm of each bridge arm each include a controllable switching transistor. Therefore, the rectifier H2 includes four controllable switching transistors S1 to S4. In addition, FIG. 12 is described by using an example in which both a transmit-end compensation network and a receive-end compensation network are in an LCC structure. Co indicates an output filter capacitor. An inverter H1 of a transmit end includes four controllable switching transistors Q1 to Q4.

A larger phase shift angle between the two bridge arms of the rectifier indicates a higher output capability of the receive end, and a smaller phase shift angle between the two bridge arms of the rectifier indicates a lower output capability of the receive end.

A receive-end controller 201 updates a reference value of a current of a transmit coil based on the phase shift angle between the two bridge arms of the rectifier, a sampled value of the current of the transmit coil, a minimum allowed value of the current of the transmit coil, and a current reference value of the current of the transmit coil, uses, as a reference value of the current of the transmit coil in a next period, a larger one of the minimum allowed value of the current of the transmit coil and an updated reference value of the current of the transmit coil, and sends the larger value to the transmit end.

The receive-end controller is configured to: when the phase shift angle between the two bridge arms of the rectifier is greater than a maximum value of a preset phase shift angle interval, and it is determined that a difference between a reference value of the current of the transmit coil that is sent to the transmit end in a previous period and a sampled value of the current of the transmit coil that is sent by the transmit end in the previous period is less than a first specified threshold, increase the reference value of the current of the transmit coil; and use, as the reference value of the current of the transmit coil in the next period, a larger one of the minimum allowed value of the current of the transmit coil and an increased reference value of the current of the transmit coil; or when the phase shift angle between the two bridge arms of the rectifier is less than a minimum value of the preset phase shift angle interval, and it is determined that the difference between the reference value of the current of the transmit coil that is sent to the transmit end in the previous period and the sampled value of the current of the transmit coil that is sent by the transmit end in the previous period is less than the first specified threshold, decrease the reference value of the current of the transmit coil; and use, as the reference value of the current of the transmit coil in the next period, a larger one of the minimum allowed value of the current of the transmit coil and a decreased reference value of the current of the transmit coil.

It is assumed that parameters of a wireless charging system are the same as those described in the transmit end embodiment, an adjustment amount of the rectifier is a phase shift angle θ between a front bridge arm and a rear bridge arm, upper transistors (S1, S3) and lower transistors (S2, S4) of each bridge arm are alternately switched on, a duty cycle is 50%, a maximum phase shift angle allowed between the front bridge arm and the rear bridge arm is θmax=180°, a minimum phase shift angle allowed between the front bridge arm and the rear bridge arm is θmin=80°, and an error of phase shift angle detection is θset=1°. The minimum phase shift angle may be set according to an actual requirement. The minimum phase shift angle is intended to ensure that an output current of the system does not flow back, in other words, reverse charging is not performed.

A drive signal and the phase shift angle of the rectifier are shown in FIG. 12.

The following describes a receive end control method with reference to a flowchart. The method is performed by a receive-end controller.

Figure 13:
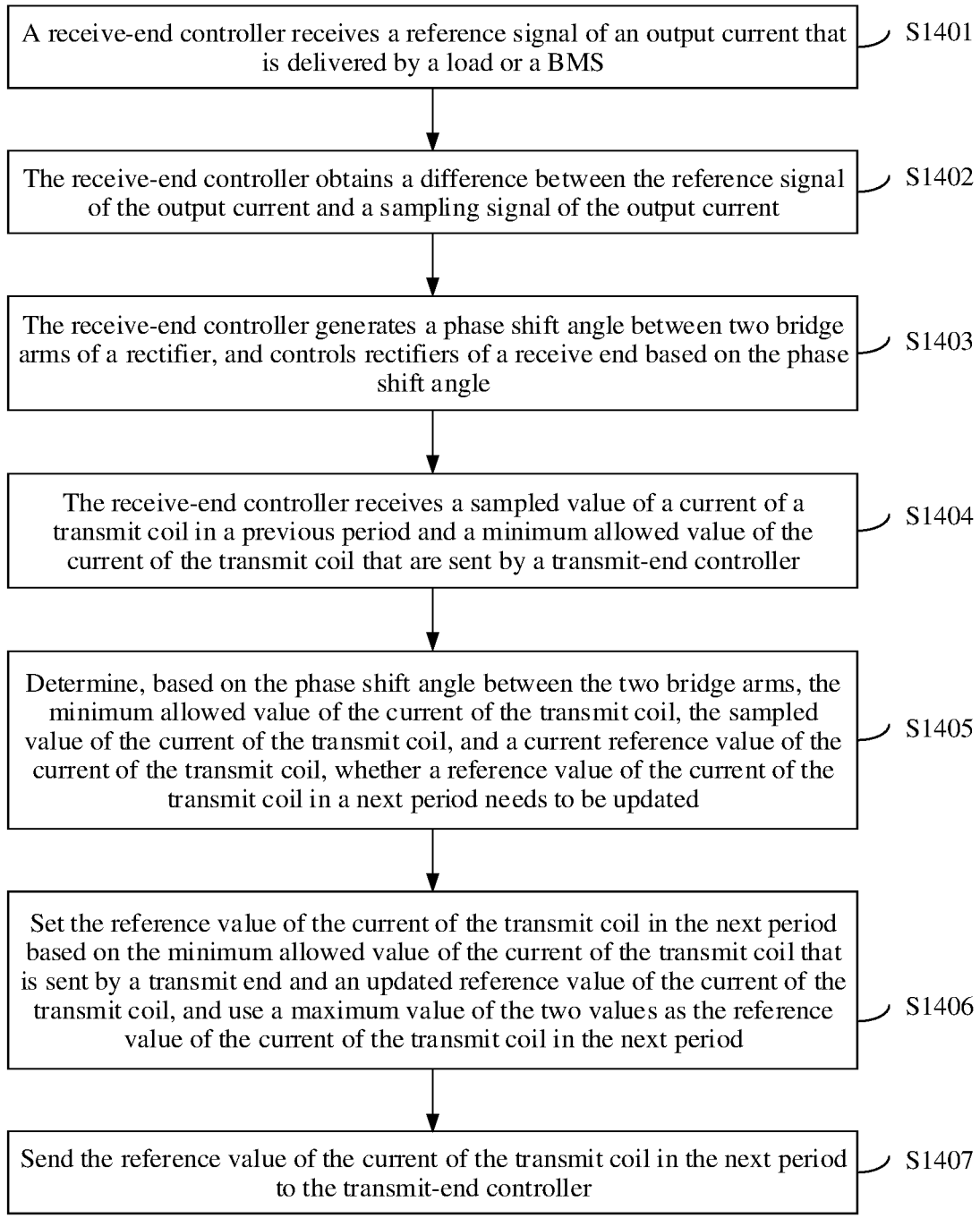
FIG. 13 is a flowchart of a method corresponding to the receive end in FIG. 11.

FIG. 13 is a flowchart of a method corresponding to the receive end in FIG. 11.

In this embodiment, a controlled parameter of a system is an output current, namely, a charging current, of the system.

S1401: The receive-end controller receives a reference signal Io_ref of an output current that is delivered by a load or a BMS.

S1402: The receive-end controller obtains a difference Io_err between the reference signal Io_ref of the output current and a sampling signal Io of the output current: Io_err=Io_ref−Io, and the receive-end controller performs compensation control on the difference Io_err. For example, PI adjustment may be performed.

S1403: The receive-end controller generates a phase shift angle θ between two bridge arms of a rectifier based on the difference between the reference signal Io_ref of the output current and the sampling signal Io of the output current, and controls actions of rectifiers S1 to S4 of the receive end based on the phase shift angle θ. The phase shift angle may be adjusted by using drive signals of S1 to S4.

S1404: The receive-end controller receives a sampled value Ip of a current of a transmit coil in a previous period and a minimum allowed value Ip_min of the current of the transmit coil that are sent by a transmit-end controller.

S1405: The receive-end controller determines, based on the phase shift angle θ between the two bridge arms, the minimum allowed value Ip_min of the current of the transmit coil, the sampled value Ip of the current of the transmit coil, and a current reference value of the current of the transmit coil, whether a reference value of the current of the transmit coil in a next period needs to be updated.

S1406: The receive-end controller sets the reference value of the current of the transmit coil in the next period based on the minimum allowed value Ip_min of the current of the transmit coil that is sent by a transmit end and an updated reference value of the current of the transmit coil, and uses a maximum value of the two values as the reference value of the current of the transmit coil in the next period.

S1407: The receive-end controller sends the reference value of the current of the transmit coil in the next period to the transmit-end controller.

Figure 14:
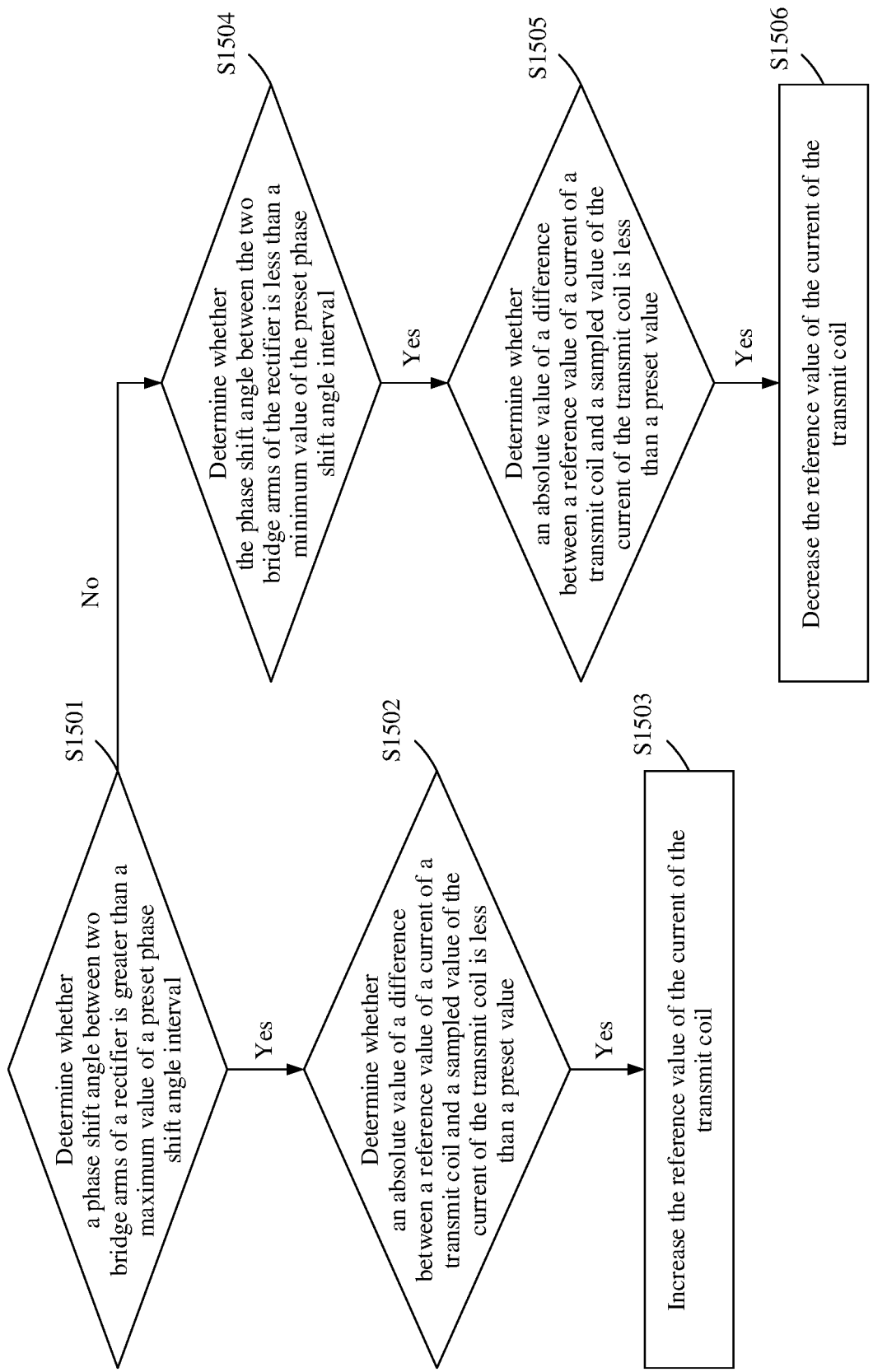
FIG. 14 is a flowchart of an implementation of S1405.

For details about implementation steps of S1405, refer to FIG. 14. FIG. 14 is a flowchart of updating a reference value of a current of a transmit coil.

The phase shift angle θ of the rectifier that is generated by the receive-end controller is compared with a preset phase shift angle interval. When the phase shift angle between the two bridge arms of the rectifier is greater than a maximum value of the preset phase shift angle interval or is less than a minimum value of the preset phase shift angle interval, it indicates that the phase shift angle of the receive end has reached a limit value of adjustment, and the phase shift angle cannot be further increased or decreased. In this case, only the reference value of the current of the transmit coil of the transmit end can be adjusted. The output current of the system cannot be changed through further adjustment by the receive end, and the output current of the system can be adjusted only by the transmit end by adjusting the current of the transmit coil.

The preset phase shift angle interval may be (θmin, θmax), where θmax>θmin. To obtain a control margin, a phase angle θset may be preset. In this case, the preset phase shift angle interval is (θmin−θset, θmax−θset). If the phase shift angle θ is greater than (θmax−θset) or is less than (θmin−θset), it indicates that the phase shift angle of the receive end has reached a limit value of adjustment, and the phase shift angle cannot be further increased or decreased. θset is a preset phase angle, may be 0 or a non-zero number, and is determined based on control precision.

S1501: The receive-end controller determines whether the phase shift angle between the two bridge arms of the rectifier is greater than the maximum value of the preset phase shift angle interval; and if yes, performs S1502; otherwise, performs S1504.

S1502: The receive-end controller determines whether an absolute value of a difference between the reference value of the current of the transmit coil and the sampled value of the current of the transmit coil is less than a preset value; and if yes, performs S1503.

The preset value may be set according to an actual requirement. For example, the preset value may be set to 1 A.

S1503: The receive-end controller increases the reference value of the current of the transmit coil.

$$Ip\_ref = Ip\_ref + \Delta Ip1$$

The reference value of the current of the transmit coil may be increased by using a first preset step. Each time it is determined that the condition is met, the reference value of the current of the transmit coil is increased by one first preset step, to gradually increase the reference value of the current of the transmit coil. The first preset step may be set according to an actual requirement. For example, the first preset step $\Delta Ip1$ may be 1 A. The reference value of the current of the transmit coil is gradually increased, until the output current Io of the system is consistent with the reference value Io_ref of the output current or the current of the transmit coil is adjusted to a maximum value.

S1504: The receive-end controller determines whether the phase shift angle between the two bridge arms of the rectifier is less than the minimum value of the preset phase shift angle interval; and if yes, performs S1505; otherwise, if the phase shift angle is within the preset phase shift angle interval, skips updating the reference value of the current of the transmit coil.

S1505: The receive-end controller determines whether an absolute value of a difference between the reference value of the current of the transmit coil and the sampled value of the current of the transmit coil is less than a preset value; and if yes, performs S1506.

The preset value may be set according to an actual requirement. For example, the preset value may be set to 1 A.

S1506: The receive-end controller decreases the reference value of the current of the transmit coil.

$$Ip_{ref} = Ip_{ref} - \Delta Ip2$$

The reference value of the current of the transmit coil may be decreased by using a second preset step. Each time it is determined that the condition is met, the reference value of the current of the transmit coil is decreased by one second preset step, to gradually decrease the reference value of the current of the transmit coil. The second preset step may be set according to an actual requirement. For example, the second preset step $\Delta Ip2$ may be 1 A. The reference value of the current of the transmit coil is gradually decreased, until an output current Io of the system is consistent with the reference value Io_ref of the output current or the current of the transmit coil is adjusted to a minimum value.

The rectifier of the receive end provided in the embodiment 2 includes only the controllable switching transistor. The following describes a case in which a rectifier includes both a controllable switching transistor and a diode.

Receive End Embodiment 3:

In this embodiment, a rectifier includes a controllable switching transistor and a diode. The rectifier may be a full-bridge rectifier or a half-bridge rectifier. The following provides descriptions by using an example in which the rectifier includes two bridge arms, an upper bridge arm of each bridge arm is a diode, and a lower bridge arm of each bridge arm is a controllable switching transistor.

Figure 15:
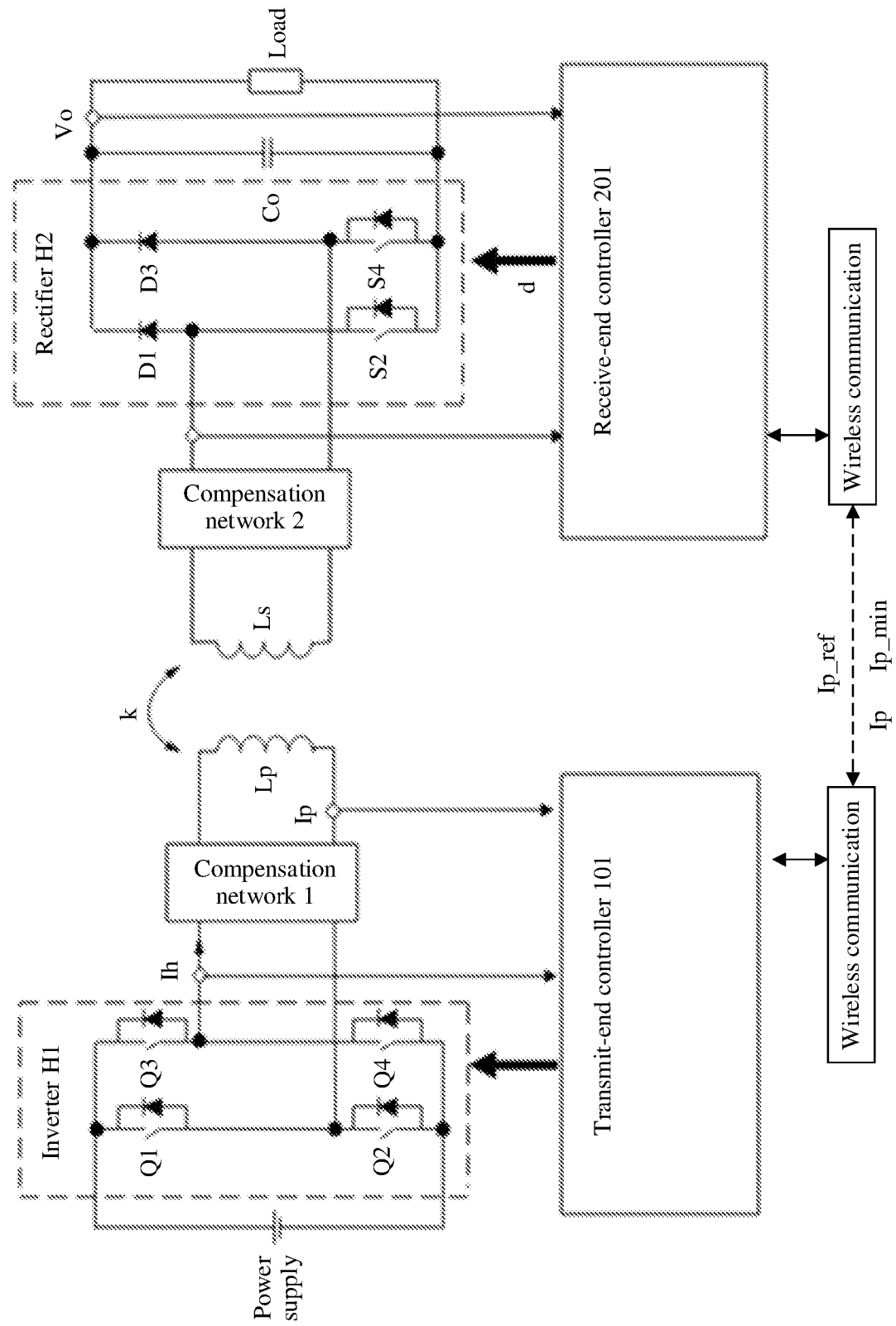
FIG. 15 is a schematic diagram of a system corresponding to another receive end according to an embodiment.

FIG. 15 is a schematic diagram of a system corresponding to another receive end according to an embodiment.

Similar to the receive end embodiment 2, because the receive end includes a controllable switching transistor, a rectifier of the receive end has an adjustable parameter, and an output parameter of the system may be adjusted by adjusting a duty cycle of the controllable switching transistor of the rectifier. For example, an output current, an output voltage, and an output power of the system are adjusted. This embodiment is described by using an example in which the output voltage of the system is adjusted.

In this embodiment, with respect to the rectifier in this structure, because the controllable switching transistor is located on a lower bridge arm, a larger duty cycle of the controllable switching transistor indicates a lower output capability of the receive end. For example, when the duty cycle is 100%, two lower bridge arms short circuit a receive coil. In this case, the receive end does not output energy.

As shown in FIG. 15, the two lower bridge arms of the rectifier include controllable switching transistors S2 and S4, and two upper bridge arms of the rectifier include diodes D1 and D3.

A receive-end controller 201 is configured to update a reference value of a current of a transmit coil based on the duty cycle of the controllable switching transistor (S2 and S4) of the rectifier H2, a sampled value of the current of the transmit coil, a minimum allowed value of the current of the transmit coil, and a current reference value of the current of the transmit coil; and use, as a reference value of the current of the transmit coil in a next period, a larger one of the minimum allowed value of the current of the transmit coil and an updated reference value of the current of the transmit coil, and send the larger value to a transmit-end controller 101.

It is assumed that a power parameter of a wireless charging system is the same as the parameter described in the transmit end embodiment, an adjustment parameter of the rectifier is the duty cycle d of the controllable switching transistors S2 and S4, and a value range of a duty cycle of a controllable switching transistor on each bridge arm is 50% to 100%. A maximum value of the duty cycle d can be only 100%, and there is no adjustment effect when the duty cycle is less than 50%. Therefore, a minimum value of the duty cycle is 50%. To ensure that the wireless charging system properly performs charging during actual operating, a duty cycle adjustment speed is as follows: dset=1%.

Figure 16:
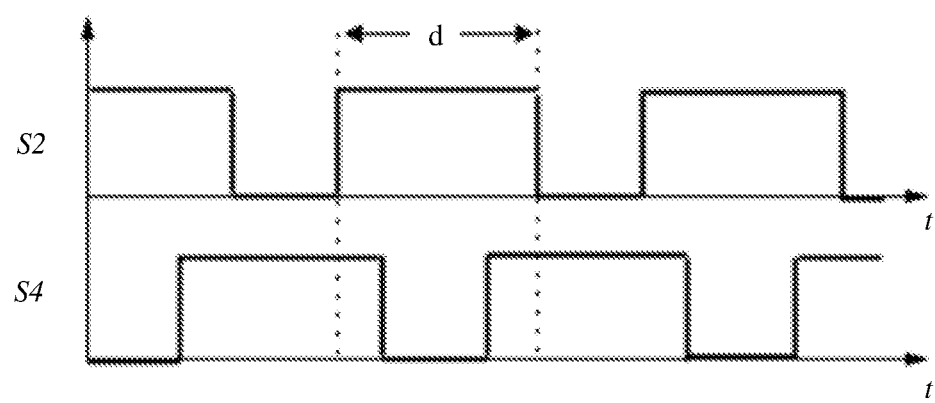
FIG. 16 is a schematic diagram of a drive signal and a duty cycle of a rectifier.

A schematic diagram of a drive signal and the duty cycle of the rectifier are shown in FIG. 16.

The drive signal is used to control an on/off status of the controllable switching transistor. For example, when the drive signal is at a high level, the controllable switching transistor is switched on; or when the drive signal is at a low level, the controllable switching transistor is switched off.

Duty cycles corresponding to S2 and S4 are equal.

The receive-end controller 201 is configured to: when the duty cycle of the controllable switching transistor of the rectifier is greater than a maximum value of a preset duty cycle interval, and it is determined that a difference between a reference value of the current of the transmit coil that is sent to a transmit end in a previous period and a sampled value of the current of the transmit coil that is sent by the transmit end in the previous period is less than a first specified threshold, decrease the reference value of the current of the transmit coil; and use, as the updated reference value of the current of the transmit coil in the next period, a larger one of the minimum allowed value of the current of the transmit coil and a decreased reference value of the current of the transmit coil. The receive-end controller 201 is further configured to: when the duty cycle of the controllable switching transistor of the rectifier is less than a minimum value of the preset duty cycle interval, and it is determined that the difference between the reference value of the current of the transmit coil that is sent to the transmit end in the previous period and the sampled value of the current of the transmit coil that is sent by the transmit end in the previous period is less than the first specified threshold, increase the reference value of the current of the transmit coil; and use, as the updated reference value of the current of the transmit coil in the next period, a larger one of the minimum allowed value of the current of the transmit coil and an increased reference value of the current of the transmit coil.

The following describes a receive end control method with reference to a flowchart. The method is performed by a receive-end controller.

Figure 17:
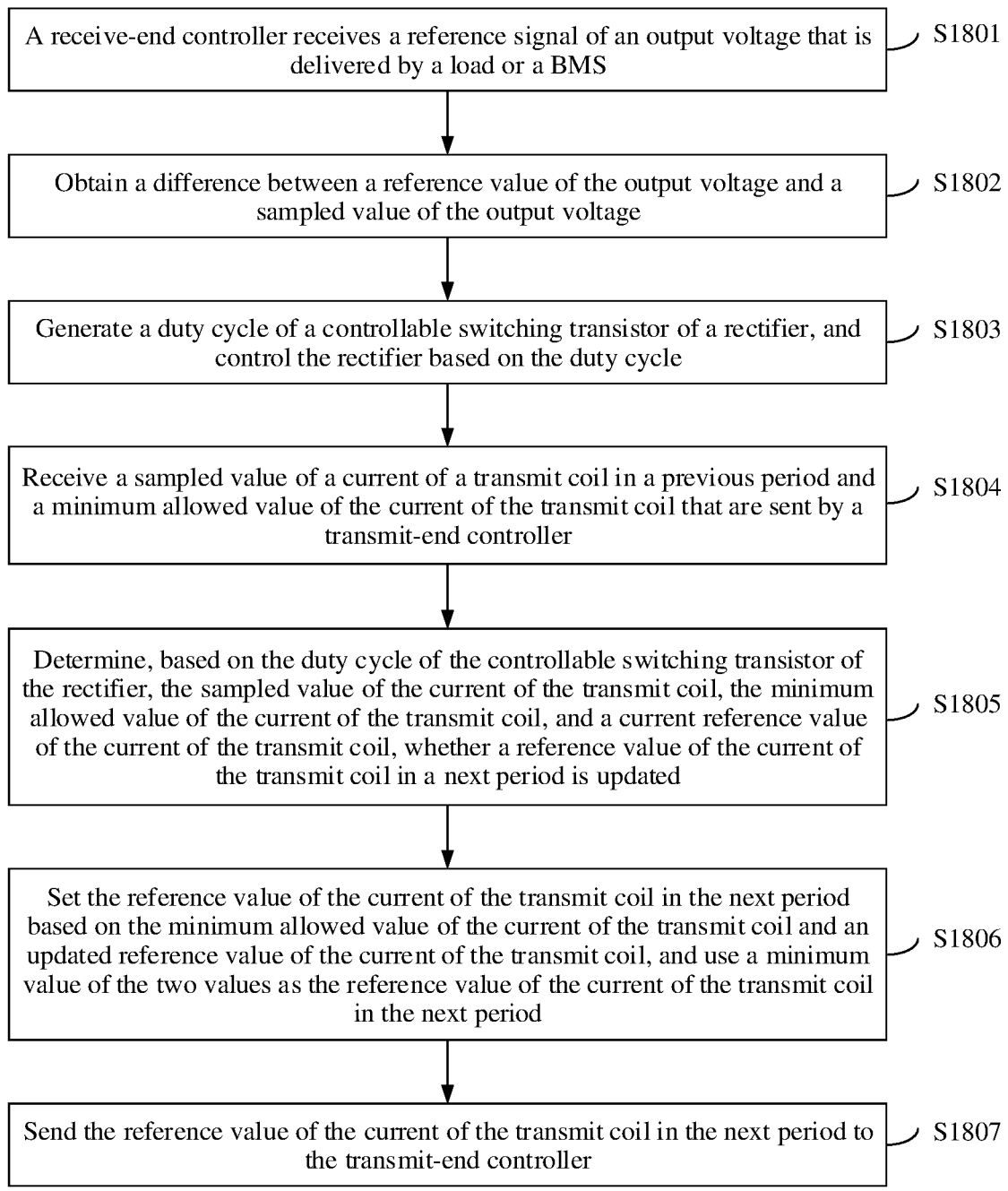
FIG. 17 is a flowchart of a method corresponding to the receive end in FIG. 15.

FIG. 17 is a flowchart of a method corresponding to the receive end in FIG. 15.

S1701: The receive-end controller receives an instruction Vo_ref of an output voltage (namely, a charging voltage) that is delivered by a load or a BMS.

S1702: The receive-end controller obtains a difference Vo_err between the reference value Vo_ref of the output voltage and a sampled value Vo of the output voltage: Vo_err=Vo_ref−Vo, and the receive-end controller performs compensation control on the difference Vo_err of the output voltage. For example, the compensation control may be PI adjustment.

S1703: The receive-end controller generates a duty cycle of a controllable switching transistor of a rectifier based on the difference between the reference value Vo_ref of the output voltage and the sampled value of the output voltage, and controls the rectifier based on the duty cycle.

S1704: The receive-end controller receives a sampled value of a current of a transmit coil in a previous period and a minimum allowed value of the current of the transmit coil that are transmitted by a transmit-end controller.

S1705: The receive-end controller determines, based on the duty cycle of the controllable switching transistor (S2 and S4) of the rectifier H2, the sampled value of the current of the transmit coil, the minimum allowed value of the current of the transmit coil, and a current reference value of the current of the transmit coil, whether to update a reference value of the current of the transmit coil in a next period.

S1706: The receive-end controller sets the reference value of the current of the transmit coil in the next period based on the minimum allowed value Ip_min of the current of the transmit coil and an updated reference value of the current of the transmit coil and uses a smaller one of the two values as the reference value of the current of the transmit coil in the next period.

S1707: The receive-end controller sends the reference value of the current of the transmit coil in the next period to the transmit-end controller.

Figure 18:
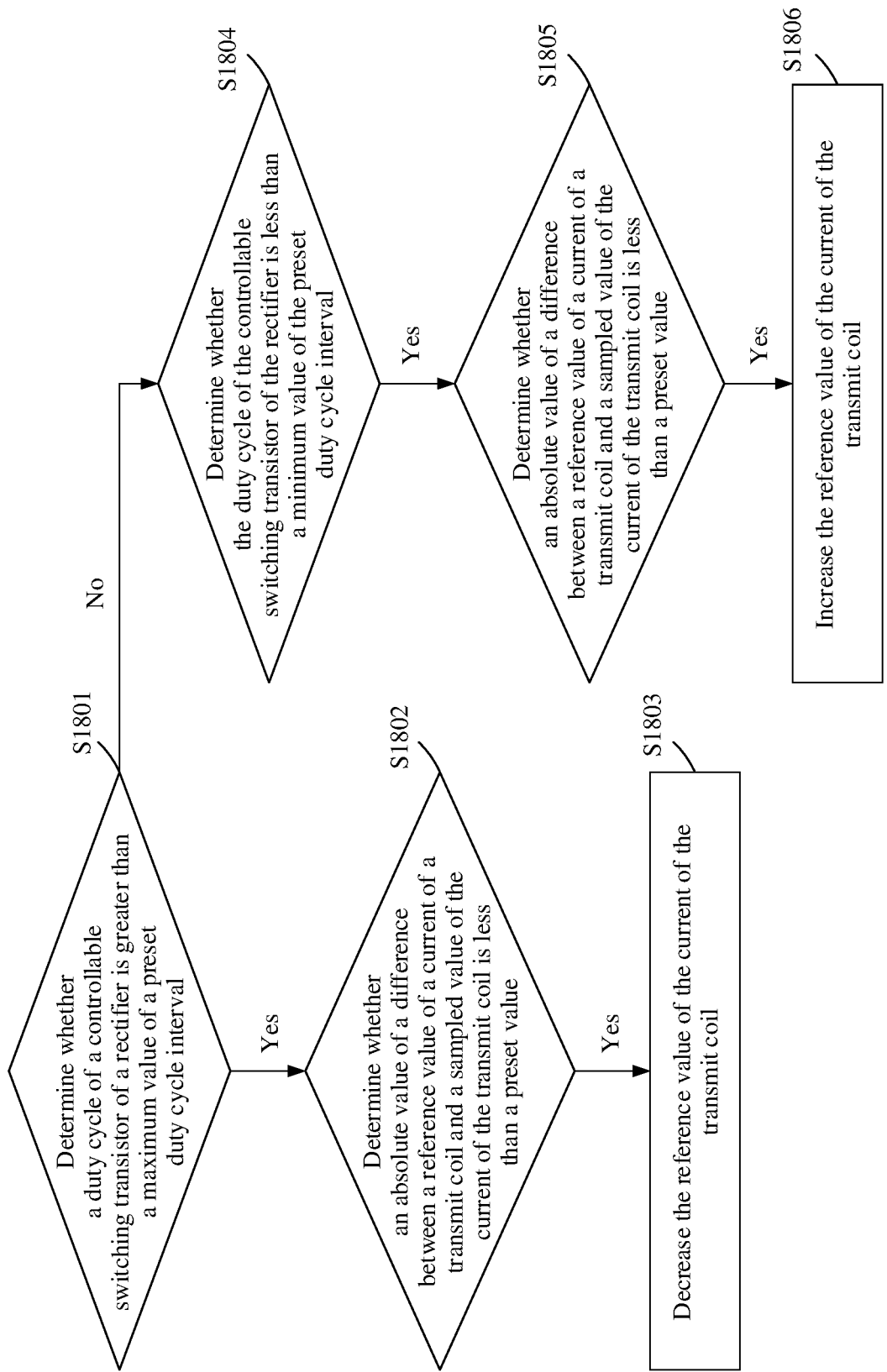
FIG. 18 is a flowchart of an implementation of S1705.

For details about implementation steps of S1705, refer to FIG. 18. FIG. 18 is a flowchart of updating a reference value of a current of a transmit coil.

The duty cycle d of the rectifier that is generated by the receive-end controller is compared with a preset duty cycle interval. When the duty cycle of the controllable switching transistor of the rectifier is greater than a maximum value of the preset duty cycle interval or is less than a minimum value of the preset duty cycle interval, it indicates that the duty cycle of the receive end has reached a limit value of adjustment, and the duty cycle cannot be further increased or decreased. In this case, only the reference value of the current of the transmit coil of a transmit end can be adjusted. An output current of a system cannot be changed through further adjustment by the receive end, and the output current of the system can be adjusted only by the transmit end by adjusting the current of the transmit coil.

The preset duty cycle interval may be (dmin, dmax), where dmax>dmin. To obtain a control margin, a phase angle dset may be preset. In this case, the preset duty cycle interval is (dmin−dset, dmax−dset). If the duty cycle d is greater than (dmax−dset) or is less than (dmin−dset), it indicates that the duty cycle of the receive end has reached a limit value of adjustment, and the duty cycle cannot be further increased or decreased. dset is a preset duty cycle. For example, dset may be set to be 1% of dmax and is determined based on control precision.

S1801: The receive-end controller determines whether the duty cycle of the controllable switching transistor of the rectifier is greater than the maximum value of the preset duty cycle interval; and if yes, performs S1802; otherwise, performs S1804.

S1802: The receive-end controller determines whether an absolute value of a difference between the reference value of the current of the transmit coil and the sampled value of the current of the transmit coil is less than a preset value; and if yes, performs S1803.

The preset value may be set according to an actual requirement. For example, the preset value may be set to 1 A.

S1803: The receive-end controller decreases the reference value of the current of the transmit coil.

$$Ip\_ref=Ip\_ref-\Delta Ip1$$

The reference value of the current of the transmit coil may be decreased by using a second preset step. Each time it is determined that the condition is met, the reference value of the current of the transmit coil is decreased by one second preset step, to gradually decrease the reference value of the current of the transmit coil. The second preset step may be set according to an actual requirement. For example, the second preset step $\Delta Ip2$ may be 1 A. The reference value of the current of the transmit coil is gradually decreased, until the output current Io of the system is consistent with a reference value Io_ref of the output current or the current of the transmit coil is adjusted to a minimum value.

S1804: The receive-end controller determines whether the duty cycle of the controllable switching transistor of the rectifier is less than the minimum value of the preset duty cycle interval; and if yes, performs S1805; otherwise, if the duty cycle is within the preset duty cycle interval, skips updating the reference value of the current of the transmit coil.

S1805: The receive-end controller determines whether an absolute value of a difference between the reference value of the current of the transmit coil and the sampled value of the current of the transmit coil is less than a preset value; and if yes, performs S1806.

The preset value may be set according to an actual requirement. For example, the preset value may be set to 1 A.

S1806: The receive-end controller increases the reference value of the current of the transmit coil.

$$Ip\_ref=Ip\_ref+\Delta Ip2$$

The reference value of the current of the transmit coil may be increased by using a first preset step. Each time it is determined that the condition is met, the reference value of the current of the transmit coil is increased by one first preset step, to gradually increase the reference value of the current of the transmit coil. The first preset step may be set according to an actual requirement. For example, the first preset step $\Delta Ip1$ may be 1 A. The reference value of the current of the transmit coil is gradually increased, until the output current Io of the system is consistent with a reference value Io_ref of the output current or the current of the transmit coil is adjusted to a maximum value.

It can be understood that the receive-end controller 201 is located in the receiving control module 1000a3 in FIG. 3.

A type of the controllable switching transistors of the transmit end and the receive end described in the foregoing embodiments may be any one of the following: a relay, an insulated gate bipolar transistor (IGBT), a metal oxide semiconductor field effect transistor (MOS transistor for short), a SiC MOSFET (silicon carbide metal oxide semiconductor field effect transistor), and the like. When the switching transistor is a MOS transistor, the switching transistor may be either a PMOS transistor or an NMOS transistor. This is not limited in the embodiments.

The receive end embodiment 2 and the receive end embodiment 3 are described by using an example in which a rectifier of a receive end includes a controllable switching transistor. Solutions are applicable to a power converter of a receive end in various structures shown in FIG. 19a, FIG. 19b, FIG. 19c, FIG. 19d, FIG. 19e, and FIG. 19f.

Figure 19A:
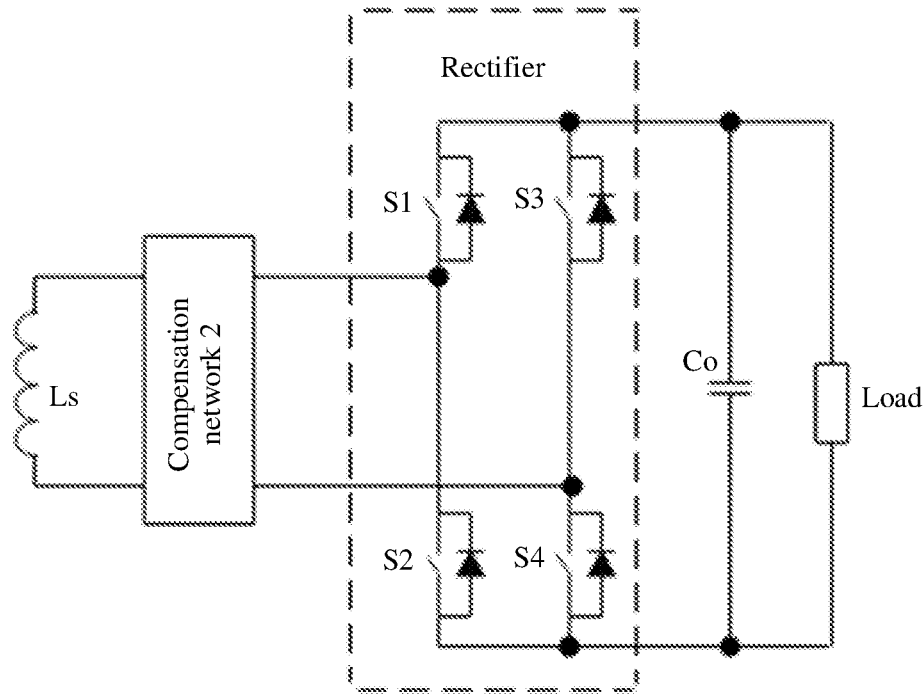
FIG. 19a is a schematic diagram of a full-bridge rectifier including four controllable switching transistors.

FIG. 19a is a schematic diagram of a full-bridge rectifier including four controllable switching transistors.

Figure 19B:
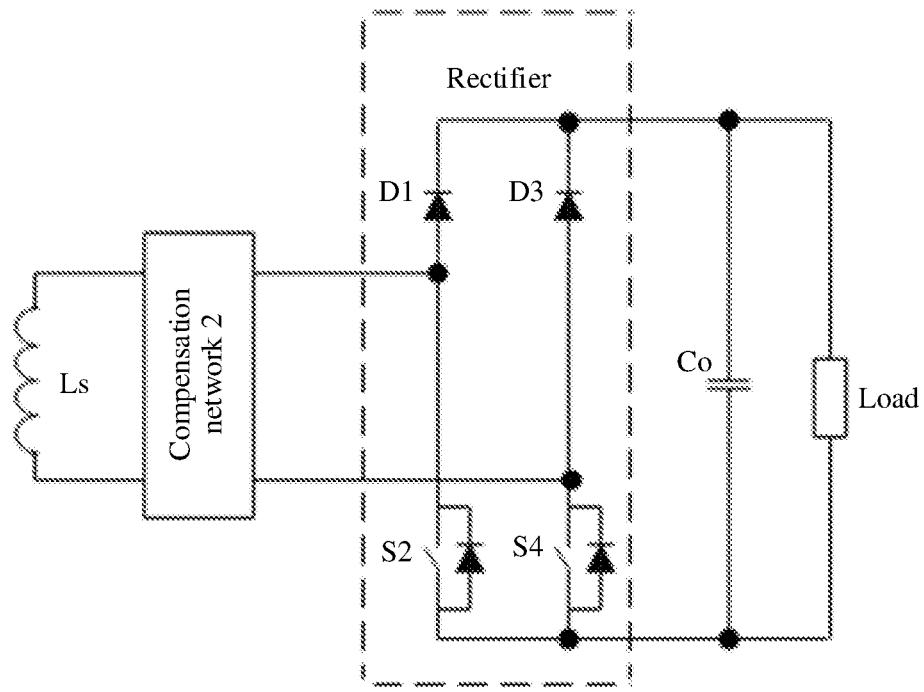
FIG. 19b is a schematic diagram of a full-bridge rectifier in which only two lower bridge arms include controllable switching transistors.

FIG. 19b is a schematic diagram of a full-bridge rectifier in which only two lower bridge arms include controllable switching transistors.

Figure 19C:
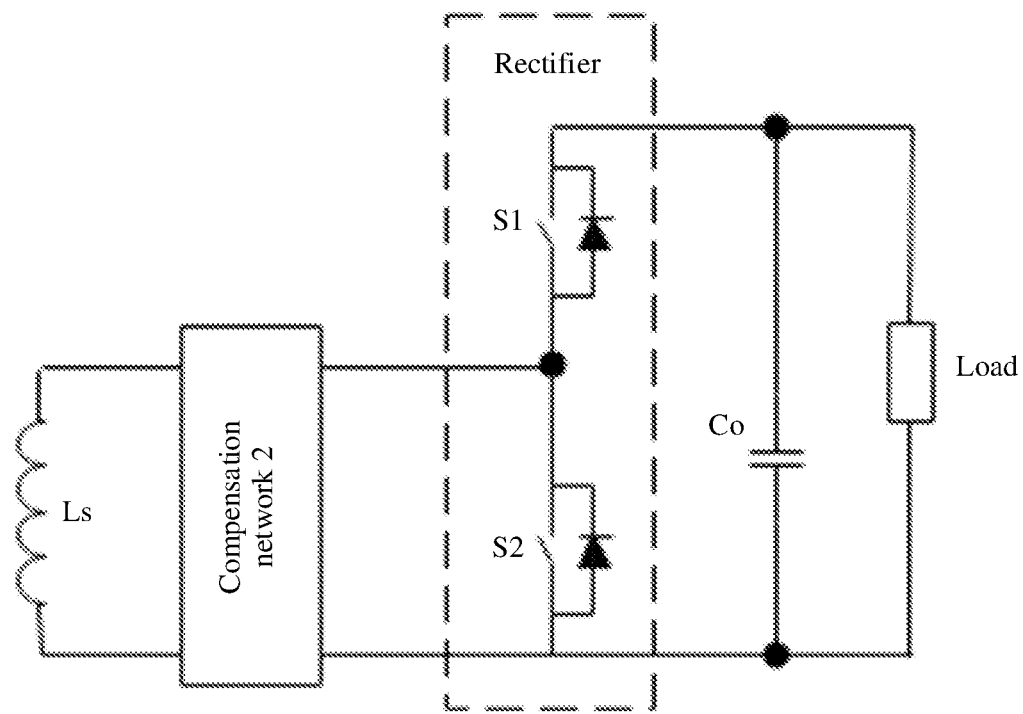
FIG. 19c is a schematic diagram of a half-bridge rectifier including two controllable switching transistors.

FIG. 19c is a schematic diagram of a half-bridge rectifier including two controllable switching transistors.

Figure 19D:
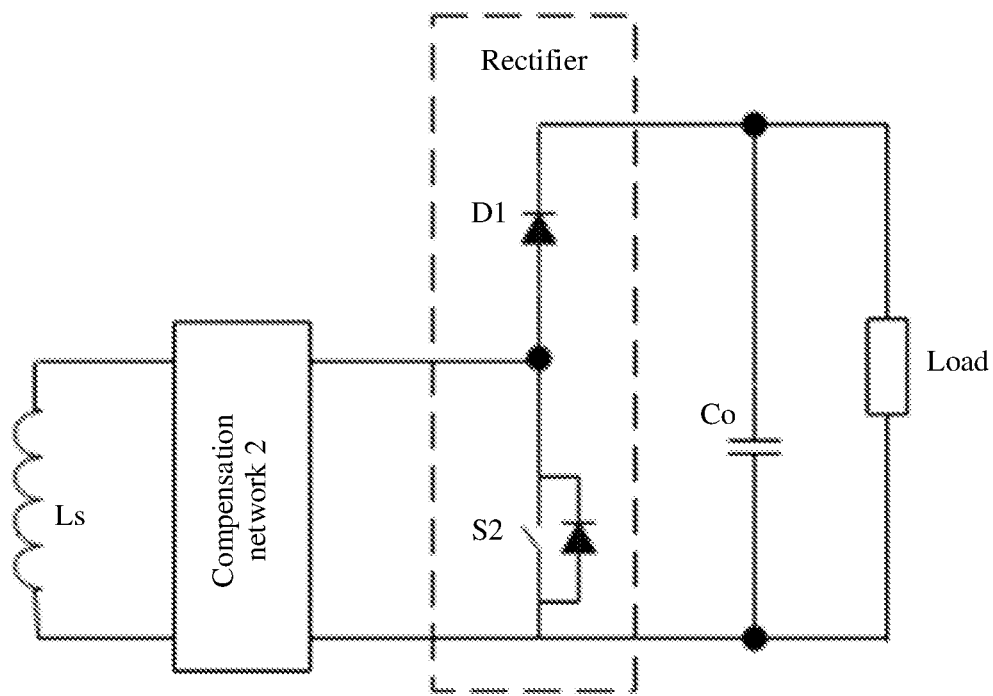
FIG. 19d is a schematic diagram of a half-bridge rectifier in which a lower bridge arm includes one controllable switching transistor.

FIG. 19d is a schematic diagram of a half-bridge rectifier in which a lower bridge arm includes one controllable switching transistor.

Figure 19E:
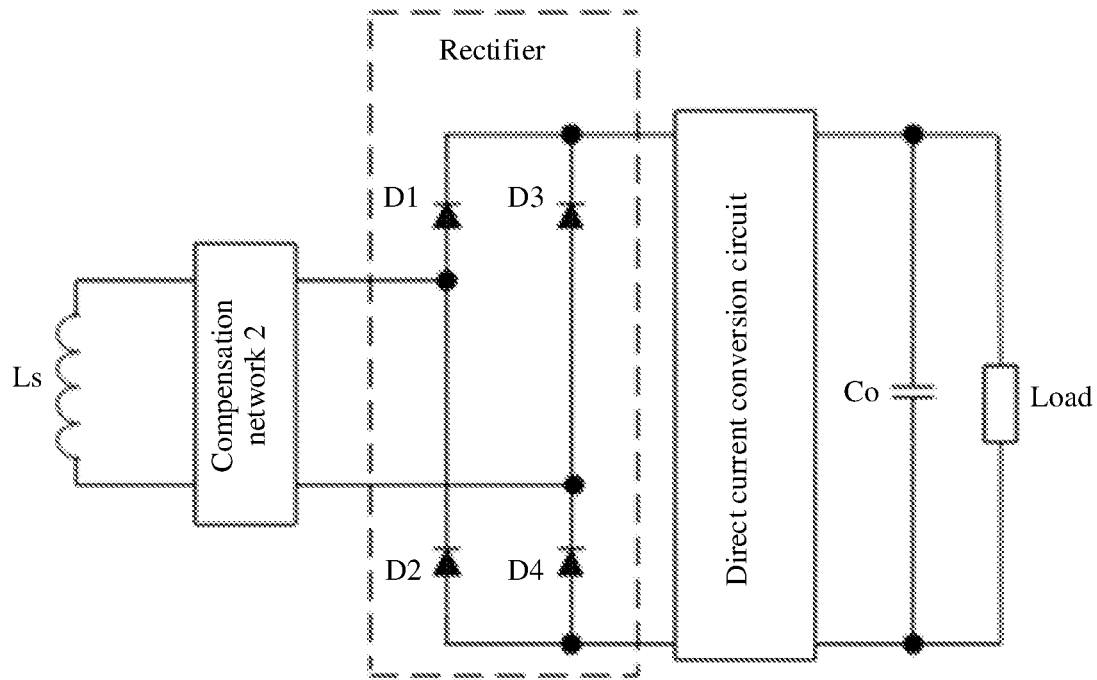
FIG. 19e is a schematic diagram of a power converter that includes a rectifier and a direct current-direct current circuit.

FIG. 19e is a schematic diagram of a power converter that includes a rectifier and a direct current-direct current (DC-DC) conversion circuit, where the rectifier is a full-bridge rectifier including four diodes. The DC-DC conversion circuit may include a controllable switching transistor. The DC-DC conversion circuit may be a boost circuit, a buck circuit, a boost-buck circuit, or the like. This is not limited in this embodiment.

Figure 19F:
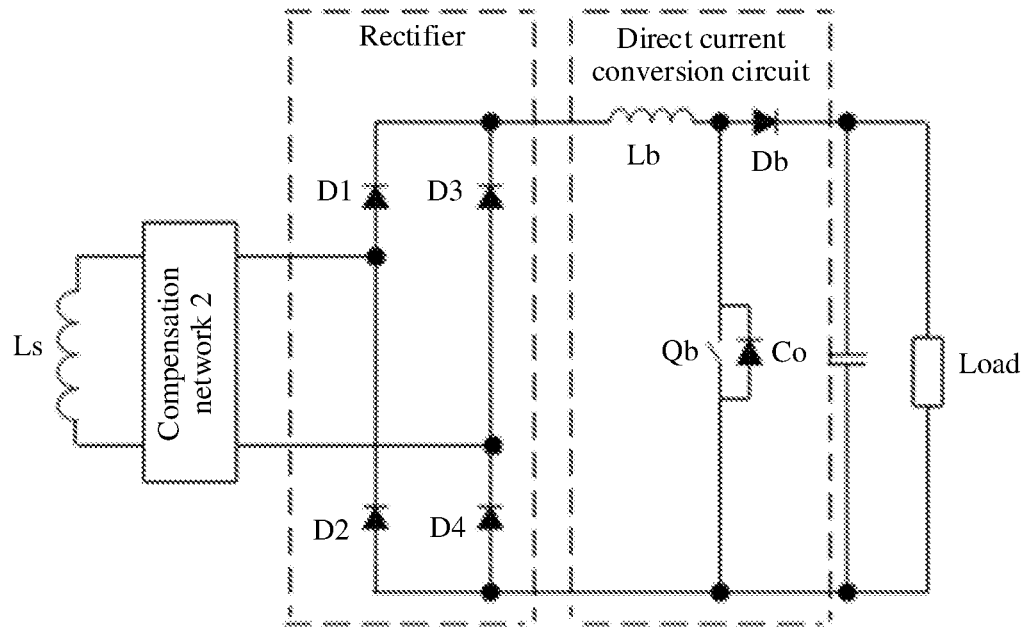
FIG. 19f is a schematic diagram of an implemented circuit with the structure in FIG. 19e.

FIG. 19f is a schematic diagram of an implemented circuit with the structure in FIG. 19e.

When the power converter includes a rectifier and a DC-DC conversion circuit, the rectifier may not include a controllable switching transistor, provided that the DC-DC conversion circuit includes a controllable switching transistor and an output parameter of a system may be adjusted by adjusting a duty cycle of the controllable switching transistor in the DC-DC conversion circuit, similar to the solution described in the receive end embodiment 3. Details are not described herein again.

Based on the transmit end, the receive end, and the corresponding methods described in the foregoing embodiments, an embodiment further provides a wireless charging system, including the transmit end and the receive end described in the foregoing embodiments.

Figure 20:
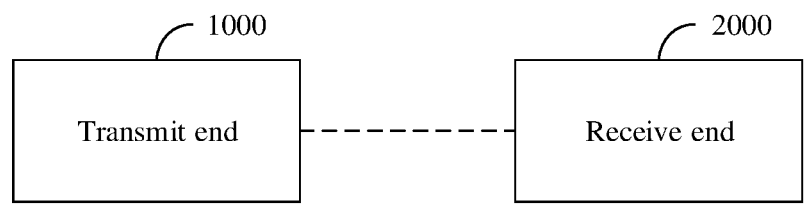
FIG. 20 is a schematic diagram of a wireless charging system according to an embodiment.

FIG. 20 is a schematic diagram of a wireless charging system according to an embodiment.

The wireless charging system provided in this embodiment includes a transmit end 1000 and a receive end 2000.

For implementations of the transmit end 1000 and the receive end 2000, refer to the foregoing embodiments. Details are not described herein again.

The transmit end additionally updates a minimum allowed value of a current of a transmit coil, to prevent shutdown upon a failure due to overcurrent of an output current of an inverter of the transmit end.

In the wireless charging system, the receive end interacts with the transmit end, to achieve better control, and enable the receive end to have a large adjustment range of the current of the transmit coil while it is ensured that the output current of the inverter does not exceed a preset upper limit value. The transmit end additionally monitors the output current of the inverter, so that an actual output current of the inverter is less than or equal to the preset upper limit value, thereby avoiding triggering protection shutdown. The receive end additionally determines whether the current of the transmit coil is properly adjusted, and periodically updates a reference value of the current of the transmit coil to avoid the following problem: When wireless communication is interrupted, the reference value of the current of the transmit coil that is sent by the receive end has a large step, resulting in overshoot of an output current of the system, and causing a safety hazard.

It should be understood that, "at least one (item)" refers to one or more and "a plurality of" refers to two or more. The term "and/or" is used to describe an association relationship between associated objects and indicates that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, "a and b", "a and c", "b and c", or "a, b, and c", where a, b, and c may be singular or plural.

The foregoing descriptions are merely exemplary embodiments, but are not intended as limiting. Although the embodiments are described above, the embodiments are not intended as limiting. By using the method and the content above, any person skilled in the art can make a plurality of possible changes and modifications, or amend the embodiments with equal effects through equivalent variations without departing from the scope of the embodiments. Therefore, any amendment, equivalent variation, and modification made on the above embodiments without departing from the content of the solutions shall fall within the scope of the embodiments.

What is claimed is:

1. A transmit end for wireless charging, comprising:
   an inverter configured to convert a direct current output by a direct-current power supply into an alternating current;
   a transmit-end compensation network configured to receive the alternating current and compensate the alternating current to transmit a compensated alternating current;
   a transmit coil configured to transmit, by using an alternating magnetic field, the alternating current compensated by the transmit-end compensation network, and
   a transmit-end controller configured to;
   compare an actual output current of the inverter with a preset upper limit value of an output current of the inverter and control an output voltage of the inverter based on a comparison result to adjust a current of the transmit coil, so that the actual output current of the inverter is less than or equal to the preset upper limit value of the output current of the inverter;
   obtain a minimum allowed value of the current of the transmit coil based on the comparison result;
   use, as a given value of the current of the transmit coil, a larger one of the minimum allowed value of the current of the transmit coil and a reference value of the current of the transmit coil that is sent by a receive end; and
   control the output voltage of the inverter based on the given value of the current of the transmit coil to adjust the current of the transmit coil, wherein the minimum allowed value of the current of the transmit coil is used to make the actual output current of the inverter less than or equal to the preset upper limit value of the output current of the inverter, when the current of the transmit coil is the smallest, correspondingly, the output current of the inverter is the largest, and the reference value of the current of the transmit coil is determined based on a target charging parameter of a wireless charging system.

2. The transmit end according to claim 1, wherein the transmit-end controller is further configured to: when a difference between the preset upper limit value of the output current of the inverter and the actual output current of the inverter is less than a first preset current value, increase the minimum allowed value of the current of the transmit coil, to increase the current of the transmit coil.

3. The transmit end according to claim 2, wherein the transmit-end controller is further configured to: when a difference between the preset upper limit value of the output current of the inverter and the actual output current of the inverter is greater than a second preset current value, decrease the minimum allowed value of the current of the transmit coil, to increase an adjustment range of the current of the transmit coil, wherein the first preset current value is less than the second preset current value.

4. The transmit end according to claim 1, wherein the transmit-end controller is further configured to obtain a phase shift angle of the inverter and an adjustment signal of an input voltage of the inverter based on a difference between the given value of the current of the transmit coil and a sampled value of the current of the transmit coil, and control the inverter based on the phase shift angle of the inverter and the adjustment signal of the input voltage of the inverter.

5. A receive end for wireless charging, comprising:
   a receive coil configured to convert an alternating magnetic field transmitted by a transmit end into an alternating current;
   a receive-end compensation network configured to receive the alternating current and compensate the alternating current to supply a compensated alternating current;
   a power converter configured to rectify the compensated alternating current into a direct current, and supply the direct current to a load; and
   a receive-end controller
   configured to receive a sampled value of a current of a transmit coil that is sent by a transmit-end controller, and update a reference value of the current of the transmit coil when a difference between the sampled value of the current of the transmit coil and the reference value of the current of the transmit coil is greater than or equal to a preset value, so that an actual output current of an inverter of the transmit end is less than or equal to a preset upper limit value of an output current of the inverter.

6. The receive end according to claim 5, wherein the receive-end controller is further configured to:
   receive a minimum allowed value of the current of the transmit coil that is sent by the transmit end,
   use, as a reference value of the current of the transmit coil in a next period, a larger one of the minimum allowed value of the current of the transmit coil and an updated reference value of the current of the transmit coil; and
   send the larger value to the transmit-end controller, wherein the minimum allowed value of the current of the transmit coil is used to make the actual output current of the inverter less than or equal to the preset upper limit value of the output current of the inverter, and when the current of the transmit coil is the smallest, correspondingly, the output current of the inverter is the largest.

7. The receive end according to claim 6, wherein the power converter comprises the rectifier, the rectifier comprises two bridge arms, and an upper bridge arm and a lower bridge arm of each bridge arm each comprise a controllable switching transistor; and
   the receive-end controller is further configured to: update the reference value of the current of the transmit coil based on a phase shift angle between the two bridge arms of the rectifier, the sampled value of the current of the transmit coil, the minimum allowed value of the current of the transmit coil, and a current reference value of the current of the transmit coil; and use, as the reference value of the current of the transmit coil in the next period, the larger one of the minimum allowed value of the current of the transmit coil and the updated reference value of the current of the transmit coil, and send the larger value to the transmit-end controller.

8. The receive end according to claim 7, wherein the receive-end controller is further configured to: when the phase shift angle between the two bridge arms of the rectifier is greater than a maximum value of a preset phase shift angle interval, and it is determined that a difference between a reference value of the current of the transmit coil that is sent to the transmit end in a previous period and a sampled value of the current of the transmit coil that is sent by the transmit end in the previous period is less than a first specified threshold, increase the reference value of the current of the transmit coil; and use, as the updated reference value of the current of the transmit coil in the next period, a larger one of the minimum allowed value of the current of the transmit coil and an increased reference value of the current of the transmit coil; or when the phase shift angle between the two bridge arms of the rectifier is less than a minimum value of the preset phase shift angle interval, and it is determined that the difference between the reference value of the current of the transmit coil that is sent to the transmit end in the previous period and the sampled value of the current of the transmit coil that is sent by the transmit end in the previous period is less than the first specified threshold, decrease the reference value of the current of the transmit coil; and use, as the updated reference value of the current of the transmit coil in the next period, a larger one of the minimum allowed value of the current of the transmit coil and a decreased reference value of the current of the transmit coil.

9. The receive end according to claim 6, wherein the power converter comprises the rectifier, a lower bridge arm of the rectifier comprises a controllable switching transistor, and an upper bridge arm of the rectifier comprises a diode; and the receive-end controller is further configured to: update the reference value of the current of the transmit coil based on a duty cycle of the controllable switching transistor of the rectifier, the sampled value of the current of the transmit coil, the minimum allowed value of the current of the transmit coil, and a current reference value of the current of the transmit coil; and use, as the reference value of the current of the transmit coil in the next period, the larger one of the minimum allowed value of the current of the transmit coil and the updated reference value of the current of the transmit coil, and send the larger value to the transmit-end controller.

10. The receive end according to claim 9, wherein the receive-end controller is further configured to:

when the duty cycle of the controllable switching transistor of the rectifier is greater than a maximum value of a preset duty cycle interval, and it is determined that a difference between a reference value of the current of the transmit coil that is sent to the transmit end in a previous period and a sampled value of the current of the transmit coil that is sent by the transmit end in the previous period is less than a first specified threshold, decrease the reference value of the current of the transmit coil; and use, as the updated reference value of the current of the transmit coil in the next period, a larger one of the minimum allowed value of the current of the transmit coil and a decreased reference value of the current of the transmit coil; or when the duty cycle of the controllable switching transistor of the rectifier is less than a minimum value of the preset duty cycle interval, and it is determined that the difference between the reference value of the current of the transmit coil that is sent to the transmit end in the previous period and the sampled value of the current of the transmit coil that is sent by the transmit end in the previous period is less than the first specified threshold, increase the reference value of the current of the transmit coil; and use, as the updated reference value of the current of the transmit coil in the next period, a larger one of the lower limit value of the current of the transmit coil and an increased reference value of the current of the transmit coil.

11. A method applied to a transmit end for wireless charging, wherein the transmit end comprises an inverter, a transmit-end compensation network, a transmit coil, and a transmit-end controller, and the method comprises:

comparing an actual output current of the inverter with a preset upper limit value of an output current of the inverter;

controlling an output voltage of the inverter based on a comparison result to adjust a current of the transmit coil, so that the actual output current of the inverter is less than or equal to the preset upper limit value of the output current of the inverter; and obtaining a lower limit value of the current of the transmit coil based on the comparison result; and using, as a given value of the current of the transmit coil, a larger one of the lower limit value of the current of the transmit coil and a reference value of the current of the transmit coil that is sent by a receive end, and controlling the output voltage of the inverter based on the given value of the current of the transmit coil to adjust the current of the transmit coil, wherein the minimum allowed value of the current of the transmit coil is used to make the actual output current of the inverter less than or equal to the preset upper limit value of the output current of the inverter, when the current of the transmit coil is the smallest, correspondingly, the output current of the inverter is the largest, and the reference value of the current of the transmit coil is determined based on a target charging parameter of a wireless charging system.

12. The method according to claim 11, further comprising:

when a difference between the preset upper limit value of the output current of the inverter and the actual output current of the inverter is less than a first preset current value, increasing the minimum allowed value of the current of the transmit coil, to increase the current of the transmit coil; or when a difference between the preset upper limit value of the output current of the inverter and the actual output current of the inverter is greater than a second preset current value, decreasing the minimum allowed value of the current of the transmit coil, to increase an adjustment range of the current of the transmit coil, wherein the first preset current value is less than the second preset current value.

13. The method according to claim 11, further comprising:

obtaining a phase shift angle of the inverter and an adjustment signal of an input voltage of the inverter based on a difference between the given value of the current of the transmit coil and a sampled value of the current of the transmit coil, and controlling the inverter based on the phase shift angle of the inverter and the adjustment signal of the input voltage of the inverter.

14. A method applied to a receive end for wireless charging, wherein the receive end comprises a receive coil, a receive-end compensation network, a power converter, and a receive-end controller, and the method comprises:

receiving a sampled value of a current of a transmit coil and a lower limit value of the current of the transmit coil that are sent by a transmit-end controller; and updating a reference value of the current of the transmit coil when a difference between the sampled value of the current of the transmit coil and the reference value of the current of the transmit coil is greater than or equal to a preset value, so that an actual output current of an inverter of a transmit end is less than or equal to a preset upper limit value of an output current of the inverter.

15. The method according to claim 14, further comprising:

using, as a reference value of the current of the transmit coil in a next period, a larger one of the lower limit value of the current of the transmit coil and an updated reference value of the current of the transmit coil, and sending the larger value to the transmit-end controller, wherein the minimum allowed value of the current of the transmit coil is used to make the actual output current of the inverter less than or equal to the preset upper limit value of the output current of the inverter, and when the current of the transmit coil is the smallest, correspondingly, the output current of the inverter is the largest.

16. The method according to claim 15, wherein the power converter comprises the rectifier, the rectifier comprises two bridge arms, and an upper bridge arm and a lower bridge arm of each bridge arm each comprise a controllable switching transistor; and further comprising:

updating the reference value of the current of the transmit coil based on a phase shift angle between the two bridge arms of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil.

17. The method according to claim 15, further comprising:

when the phase shift angle between the two bridge arms of the rectifier is greater than a maximum value of a preset phase shift angle interval, and it is determined that a difference between a reference value of the current of the transmit coil that is sent to the transmit end in a previous period and a sampled value of the current of the transmit coil that is sent by the transmit end in the previous period is less than a first specified threshold, increasing the reference value of the current of the transmit coil; and using, as the updated reference value of the current of the transmit coil in the next period, a larger one of the minimum allowed value of the current of the transmit coil and an increased reference value of the current of the transmit coil; or when the phase shift angle between the two bridge arms of the rectifier is less than a minimum value of the preset phase shift angle interval, and it is determined that the difference between the reference value of the current of the transmit coil that is sent to the transmit end in the previous period and the sampled value of the current of the transmit coil that is sent by the transmit end in the previous period is less than the first specified threshold, decreasing the reference value of the current of the transmit coil; and using, as the updated reference value of the current of the transmit coil in the next period, a larger one of the minimum allowed value of the current of the transmit coil and a decreased reference value of the current of the transmit coil.

18. The method according to claim 14, wherein the power converter comprises the rectifier, a lower bridge arm of the rectifier comprises a controllable switching transistor, and an upper bridge arm of the rectifier comprises a diode; and further comprising:

updating the reference value of the current of the transmit coil based on a duty cycle of the controllable switching transistor of the rectifier, the sampled value of the current of the transmit coil, the minimum allowed value of the current of the transmit coil, and a current reference value of the current of the transmit coil, and using, as the reference value of the current of the transmit coil in the next period, the larger one of the minimum allowed value of the current of the transmit coil and the updated reference value of the current of the transmit coil.

19. The method according to claim 17, further comprising:

when the duty cycle of the controllable switching transistor of the rectifier is greater than a maximum value of a preset duty cycle interval, and it is determined that a difference between a reference value of the current of the transmit coil that is sent to the transmit end in a previous period and a sampled value of the current of the transmit coil that is sent by the transmit end in the previous period is less than a first specified threshold, decreasing the reference value of the current of the transmit coil; and using, as the updated reference value of the current of the transmit coil in the next period, a larger one of the minimum allowed value of the current of the transmit coil and a decreased reference value of the current of the transmit coil; or when the duty cycle of the controllable switching transistor of the rectifier is less than a minimum value of the preset duty cycle interval, and it is determined that the difference between the reference value of the current of the transmit coil that is sent to the transmit end in the previous period and the sampled value of the current of the transmit coil that is sent by the transmit end in the previous period is less than the first specified threshold, increasing the reference value of the current of the transmit coil; and using as the updated reference value of the current of the transmit coil in the next period, a larger one of the minimum allowed value of the current of the transmit coil and an increased reference value of the current of the transmit coil.

20. A wireless charging system, comprising:
a transmit end for wireless charging; and
a receive end for wireless charging, wherein the transmit end for wireless charging, comprises an inverter, a transmit-end compensation network, a transmit coil, and a transmit-end controller, wherein the inverter is configured to convert a direct current output by a direct-current power supply into an alternating current, and supply the alternating current to the transmit-end compensation network;

the transmit-end compensation network is configured to compensate the alternating current output by the inverter, and transmit a compensated alternating current to the transmit coil;

the transmit coil is configured to transmit, by using an alternating magnetic field, the alternating current compensated by the transmit-end compensation network; and the transmit-end controller is configured to compare an actual output current of the inverter with a preset upper limit value of an output current of the inverter, and control an output voltage of the inverter based on a comparison result to adjust a current of the transmit coil, so that the actual output current of the inverter is less than or equal to the preset upper limit value of the output current of the inverter;

wherein the receive end for wireless charging, comprises a receive coil, a receive-end compensation network, a power converter, and a receive-end controller, the receive coil is configured to convert an alternating magnetic field transmitted by a transmit end into an alternating current, and transmit the alternating current to the compensation network;

the receive-end compensation network is configured to compensate the alternating current, and supply a compensated alternating current to a rectifier;

the power converter is configured to rectify the compensated alternating current into a direct current, and supply the direct current to a load; and the receive-end controller is configured to receive a sampled value of a current of a transmit coil that is sent by a transmit-end controller, and update a reference value of the current of the transmit coil when a difference between the sampled value of the current of the transmit coil and the reference value of the current of the transmit coil is greater than or equal to a preset value, so that an actual output current of an inverter of the transmit end is less than or equal to a preset upper limit value of an output current of the inverter.

* * * * *